(12) United States Patent  (10) Patent No.: US 8,459,803 B2
Plut  (45) Date of Patent: Jun. 11, 2013

(54) MULTI-SOURCE PROJECTION-TYPE DISPLAY

(75) Inventor: William J. Plut, Los Altos, CA (US)

(73) Assignee: Transpacific Image, LLC, Wilmington, DE (US)

( * ) Notice: Subject to any disclaimer, the term of this patent is extended or adjusted under 35 U.S.C. 154(b) by 0 days.

(21) Appl. No.: 13/452,638

(22) Filed: Apr. 20, 2012

(65) Prior Publication Data

US 2012/0206343 A1 Aug. 16, 2012

Related U.S. Application Data

(62) Division of application No. 12/477,534, filed on Jun. 3, 2009, now abandoned.

(51) Int. Cl.
*G03B 21/14* (2006.01)

(52) U.S. Cl.
USPC .............................................. 353/94; 353/30

(58) Field of Classification Search
USPC ... 353/28, 30, 94; 434/44; 463/30–34; 345/1.1, 345/1.3
See application file for complete search history.

(56) References Cited

U.S. PATENT DOCUMENTS

| | | | | |
|---|---|---|---|---|
| 4,348,186 A | * | 9/1982 | Harvey et al. | 434/44 |
| 4,634,384 A | * | 1/1987 | Neves et al. | 434/44 |
| 5,242,306 A | * | 9/1993 | Fisher | 434/44 |
| 5,278,596 A | | 1/1994 | Machtig et al. | |
| 5,424,771 A | | 6/1995 | Yu et al. | |
| 5,927,985 A | * | 7/1999 | Lechner | 434/44 |
| 5,980,044 A | * | 11/1999 | Cannon et al. | 353/30 |
| 6,309,072 B1 | | 10/2001 | Deter | |
| 7,015,983 B2 | | 3/2006 | Saccomanno et al. | |
| 7,130,447 B2 | * | 10/2006 | Aughey et al. | 382/103 |
| 7,312,765 B2 | * | 12/2007 | de Wit et al. | 345/7 |
| 7,488,072 B2 | * | 2/2009 | Perlin et al. | 351/209 |
| 7,719,484 B2 | * | 5/2010 | Turner et al. | 345/8 |
| 7,872,635 B2 | * | 1/2011 | Mitchell | 345/158 |
| 7,954,957 B2 | | 6/2011 | Izumida et al. | |
| 7,967,444 B2 | * | 6/2011 | Hung et al. | 353/30 |
| 2001/0048801 A1 | | 12/2001 | Saccomanno et al. | |

(Continued)

FOREIGN PATENT DOCUMENTS

| EP | 1359772 A2 | 11/2003 |
|---|---|---|
| EP | 2872924 | 1/2006 |

(Continued)

OTHER PUBLICATIONS

International Search Report and Written Opinion for International Application No. PCT/US2010/029964 mailing date Aug. 25, 2010, 13 pages.
Office Action dated Oct. 12, 2011 for U.S. Appl. No. 12/477,534, 12 pages.

*Primary Examiner* — William C Dowling
(74) *Attorney, Agent, or Firm* — Turocy & Watson, LLP

(57) ABSTRACT

A display device capable of displaying a plurality of projection images is provided. The display device includes a light source within a base and a plurality of projection outputs. Each projection output comprises an optical modulation device and a projection lens system. The light source includes a switch and a plurality of light sources such as lasers or LEDs with different color to one another. The switch receives and diverts light beams from the light sources in a predetermined sequential order to the plurality of projection outputs.

40 Claims, 24 Drawing Sheets

U.S. PATENT DOCUMENTS

| | | |
|---|---|---|
| 2002/0063854 A1 | 5/2002 | Flint |
| 2004/0109141 A1 | 6/2004 | Dho et al. |
| 2004/0125044 A1* | 7/2004 | Suzuki .......................... 345/1.1 |
| 2005/0057542 A1 | 3/2005 | Plut |
| 2007/0195275 A1 | 8/2007 | Drazic et al. |
| 2010/0226535 A1* | 9/2010 | Kimchi et al. ................ 382/103 |
| 2010/0309293 A1 | 12/2010 | Plut et al. |
| 2010/0309390 A1 | 12/2010 | Plut et al. |
| 2011/0116050 A1 | 5/2011 | Katou et al. |

FOREIGN PATENT DOCUMENTS

| | | |
|---|---|---|
| JP | 09134135 | 5/1997 |
| WO | 0191471 A2 | 11/2001 |
| WO | 2006003205 A1 | 1/2006 |
| WO | 2010018623 A1 | 2/2010 |

\* cited by examiner

MULTI-SOURCE PROJECTION-TYPE DISPLAY

CROSS-REFERENCE TO RELATED APPLICATIONS

This application is a division of U.S. patent application Ser. No. 12/477,534, filed Jun. 3, 2009, entitled "Multi-Source Projection-Type Display" which is hereby incorporated by reference in its entirety.

BACKGROUND

In general, a projection-type display or video projector displays an image that corresponds to a video signal upon a projection screen or other surface (e.g., wall). One of the major characteristics of projection-type display devices is their ability to display images that are larger in size than images produced by other displays such as CRT (cathode-ray tube) or LCD (liquid crystal display). Projection-type display devices have relatively smaller size compared to the image capable of being projected.

Traditionally, these video projection devices are widely used for business presentations, classroom training, home theater, etc. For example, projection devices are widely used in many schools and institutions to project onto an interactive white board during the course of teaching students.

Most modern projection devices are capable of correcting distortion, focus, and other inconsistencies by way of manual controls. However, to date, conventional projection-type display devices have been designed in a fixed CRT/LCD traditional mindset, such as single video output per device, or a lack of portability for a large image.

DETAILED DESCRIPTION

Figure 1:
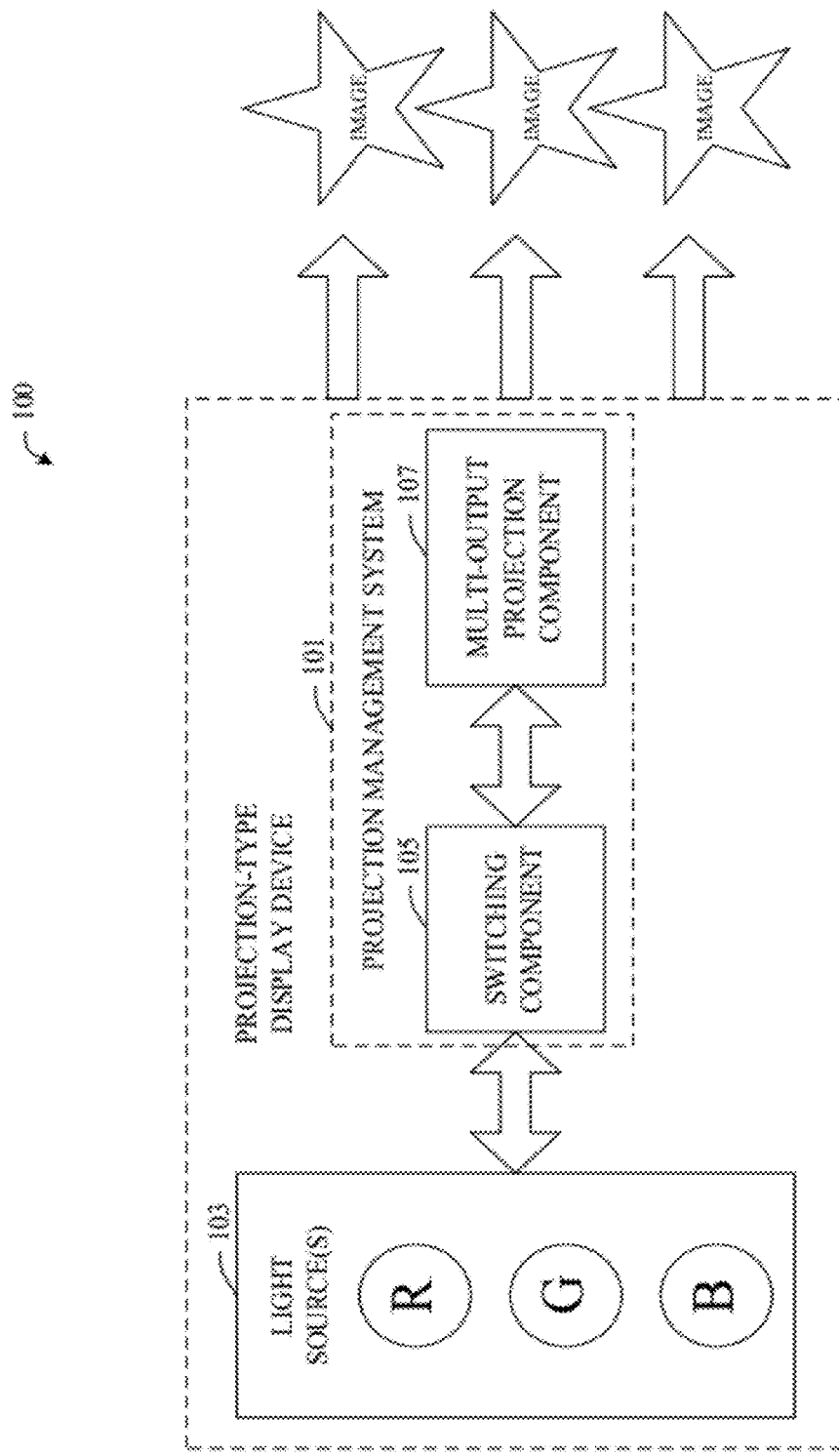
FIG. 1 illustrates an example system that facilitates selective projection of images in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution, and a component may be localized on one computer and/or distributed between two or more computers.

The innovation disclosed and claimed herein, in aspects thereof, comprises a projection system that displays a plurality of images upon a single or a plurality of surfaces. In aspects, a switch is provided that selectively diverts light to each of a plurality of projection outputs, for example, in accordance with predetermined video data. The multiple projection outputs enable multiple images to be displayed upon a single or multiple surfaces simultaneously.

Moreover, color wheels have conventionally been used as a type of analog switch, but are deficiencies inherent to the switching with color wheels that can cause temporary gaps in the resulting display that are sometimes noticeable during viewing. Thus, in accordance with a one non-limiting benefit of one or more embodiments described herein, digital switching of multiples colored light output is enabled that does not suffer from the temporary gaps inherent in analog color wheels. In non-limiting implementations of multiple outputs, three outputs from three projection heads are provided in correspondence to three light sources, e.g., red, green and blue light sources such as light emitting diodes (LEDs) or lasers.

In other non-limiting embodiments, a projection apparatus not only provides digital control of the positioning of multiple light outputs, but also mechanical control on top of the digital control of the light outputs. In these embodiments, in addition to providing digital switching among multiple colored light outputs, the light outputs can be physically moved by way of mechanical structure, such as a semi-rigid but bendable structure, to additionally aim of the colored light outputs. In this way, while the projection apparatus may be able to handle 60 inch image/video rendering, a user can adjust the outputs mechanically to achieve a subset of the total imaging space possible, e.g., such that the lights outputs cover a 40 inch image/video rendering. Thus, less than the total imaging space can be realized through the combination of digital switching of multiple colored light outputs as well as mechanical maneuverability of the light outputs.

In other aspects of the subject innovation, the system may automatically adjust resolution of each (or all) of the displayed images. In other aspects, multiple image alignment may be adjusted as appropriate or otherwise desired. In embodiments, keystone correction may be employed to adjust a displayed image in accordance with a displayed surface. Similarly, image quality may be monitored and detected. Accordingly, light sources may be dynamically controlled as a function of captured data.

Referring initially to the drawings, FIG. 1 illustrates an example block diagram of a system 100 that facilitates projection display in accordance with aspects of the innovation. Generally, the system 100 may include a projection management system 101 that enables multiple images to be projected from the projection-type device 100 as illustrated. Projection management system 101 may include a switching component 105 and a multi-projection output component 107 which together facilitate simultaneous projection of multiple images from a single projection-type display device 100.

As shown in FIG. 1, the light source may include multiple sources, for example, a red, green and blue laser set as illustrated in the example. Red, green and blue light emitting diode (LED) sets may also be used. The switching component 105 may direct or route a red laser, the green laser and the blue laser in a predetermined order to a light modulation device within each multi-chamber projection component 107. In other words, in one example, the switching component 105 may direct light in an alternating, cyclical or other determined order such that each projection output component 107 may sequentially share light generated from an individual source. It will be understood that, while the projection-type display device 100 may employ multiple projection outputs (107) to generate multiple images, light sources 103 may be shared between the outputs thereby not requiring dedicated light sources for each projection output.

Figure 2:
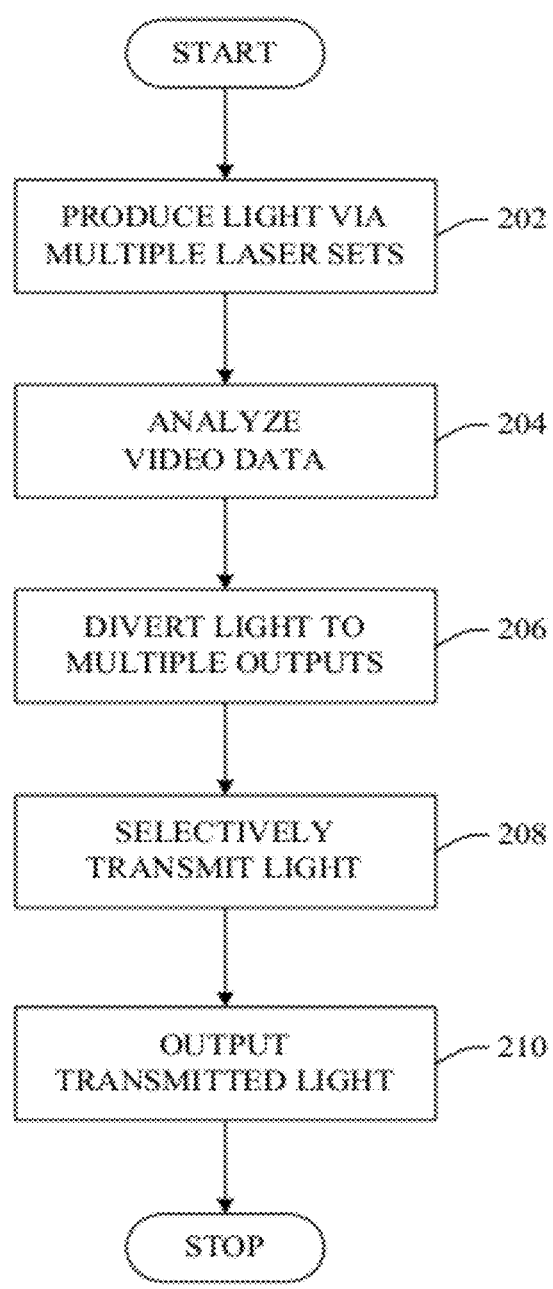
FIG. 2 illustrates an example flow chart of procedures that facilitate multi-image projection in accordance with aspects of the innovation.

FIG. 2 illustrates a methodology of transmitting multiple images via a projection-type display in accordance with aspects of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, light is produced via multiple light sources such as multiple laser sets. In alternative aspects, it is to be understood that light may be produced via multiple light emitting diodes (LEDs) or other suitable light source. Video data may be analyzed at 204, for example, to determine an intended display configuration. In examples, the innovation may be used to project multiple images upon a single surface. Alternative, in other aspects, multiple surfaces may be employed to display multiple images.

At 206, light may be diverted to multiple outputs 107 as described with reference to FIG. 1. In operation, light may be routed to outputs 107 based upon the analysis of 204. For example, light may be sequentially transmitted or routed to each of the outputs 107 in a predetermined manner or timing sequence. It is to be understood that timing may vary in accordance with most any sequence or desired presentation scheme.

At 208, light may be selectively transmitted. For example, modulation devices within each output may selectively transmit light in accordance with video data. At 210, the transmitted light may be output onto a surface or screen. In other aspects, multiple surfaces or screens may be employed to output or display images. As described above, multiple projection chambers may be used to project multiple images from a single projection-type display device, though chambers are optional in that multiple light outputs is sufficient. The figures that follow illustrate more detailed example devices in accordance with the features, functions and benefits of the innovation. Thus, the innovation will be better understood upon a review of the disclosure with respect to the following figures.

Figure 3:
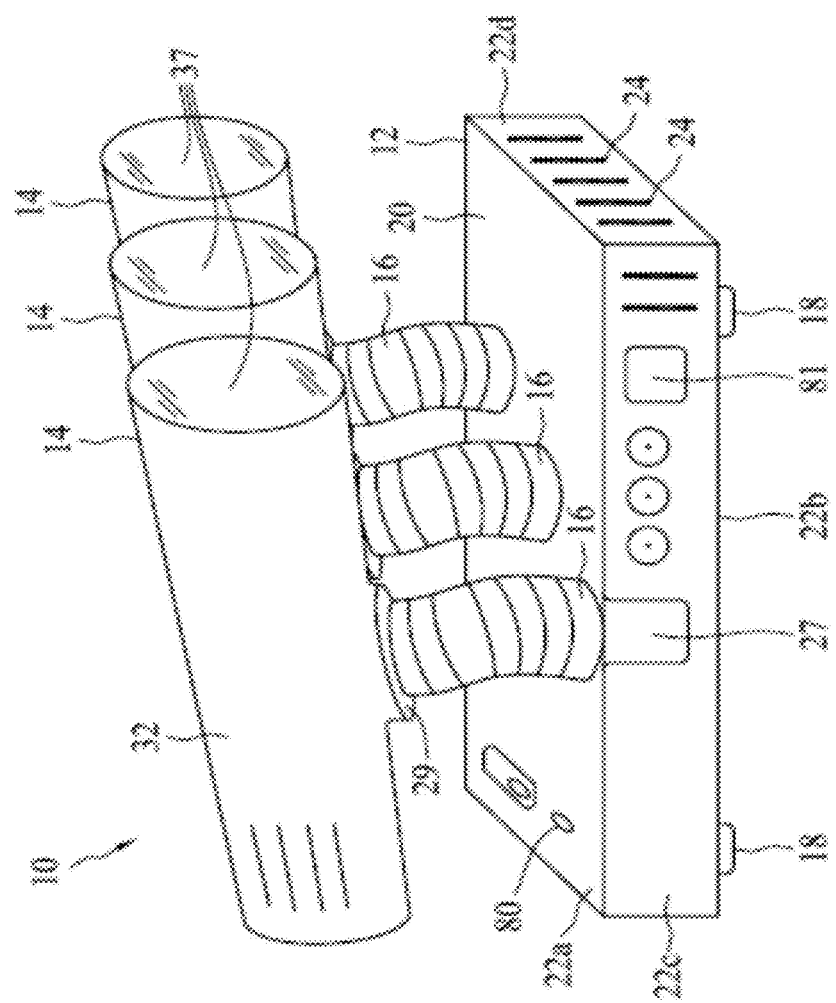
FIG. 3 illustrates a perspective view of a display device in accordance with embodiments.

Referring now to FIG. 3, there is illustrated top perspective view of an example display device 10 in accordance with one of the present embodiments. Display device 10 is capable of producing and projecting one or more video images on one or more receiving surfaces as desired. As shown, device 10 comprises a base 12, a plurality of projection outputs 14 that each include a separate projection output, and a plurality of positional interfaces 16.

Base 12 is configured to maintain a position of display device 10, e.g., relative to a stationary object. In embodiments, base 12 includes a relatively flat bottom that allows display device 10 to rest upon a flat surface such as a table or desk. One or more high friction pads 18 attach to a bottom surface 22b of base 12 to increase static friction with the flat surface. Base 12 may also comprise a receiving slot 27 that allows modular attachment of functional accessories for display device 10. For example, slot 27 may receive a clip attachment that comprises a spring-powered clip for clamping base 12 onto a stationary object. This allows base 12 and display device 10 to be mounted on non-flat or non-horizontal surfaces such as vertical walls of bookshelves and cubicles, and personal clothing or accessories such as belts or straps, for example. Base 12 may also comprise another slot on its bottom side, dimensioned the same, to permit reception of the functional accessories on the bottom side of base 12.

A housing 20 protects internal components within base 12, defines outer dimensions of base 12, and defines dimensions of an inner light source output. As shown, housing 20 is about rectangular and comprises four sidewalls 22c-f (only facing sidewalls 22c and 22d are shown in the figure), top wall 22a, and bottom wall 22b. Walls 22 comprise a suitably stiff or rigid material that grants structural rigidity for base 12 and mechanical protection for internal components within housing 20. A lightweight and rigid plastic, composite, alloy or aluminum is suitable in this regard. One or more walls of housing 20 may also include air vents 24 that allow air flow between the inner chamber and an environment external to housing 20. In other embodiments, housing 20 includes a more rounded or contoured shape than that shown in FIG. 3 and does not include orthogonal walls or a rectangular shape.

Each projection output 14, such as but not limited to a projection chamber 14 as presently described, may include components responsible for the production of images based on received light and received video data, and components capable for the projection of those images. Projection chamber 14 comprises a projection chamber housing 32, an optical modulation device (within projection chamber housing 32, not shown), and an output projection lens system (within projection chamber housing 32, not shown). In accordance with aspects of the innovation, the optical modulation device selectively transmits light generated by a light source in base 12 according to video data included in a video signal provided to the optical modulation device, and will be described in further detail with respect to the figures that follow. The projection lens system outputs light transmitted by the optical modulation device along a projection path, and will also be described in further detail infra.

In operation, a light source within base 12 generates light which is provided to the optical modulation device within projection chamber 14 as a luminous flux. In embodiments, one or more optical fibers transmit light from the light source within base 12 to the optical modulation device within projection chamber 14. The optical modulation device selectively transmits light according to video data in a signal that corresponds to an image to be projected. The projection lens system enlarges and projects an image formed by the optical modulation device. The image is cast with a splay angle such that the image enlarges as the distance to a receiving surface increases.

Projection chamber 14 comprises a projection chamber housing 32 that protects internal components of projection chamber 14; and defines outer and inner dimensions of projection chamber 14. As shown, projection chamber housing 32 is substantially cylindrical, except for an added receiving interface 29 on its bottom side. Projection chamber housing 32 has a cylindrical axis that is about collinear with output projection path. An output optical projection lens 37 of the projection lens system forms and seals forward end of projection chamber 14.

In embodiments, the average diameter of cylindrical projection chamber housing 32 is relatively within ten percent of the diameter of output optical projection lens 37. In other embodiments, projection chamber housing 32 tapers slightly such that its forward end is slightly larger than an aft end, resulting in a slightly frustoconical shape where lens 37 constitutes the larger end.

It is to be understood that the shape and design of projection chamber 14 may vary in alternative aspects. For example, forward end of projection chamber 14 may be rounded to accommodate a circular output lens 37 while aft end is cornered to accommodate a rectangular optical modulation device and associated support components that are locally contained better by a rectangular housing. Projection chamber housing 32 defines an inner chamber as described in further detail below. Projection chamber housing 32 comprises a suitably stiff material for structural rigidity of base 12 and internal component protection. A lightweight and rigid plastic, composite, alloy or aluminum is suitable for several embodiments.

Receiving interface 29 is disposed on the lower side of projection chamber 14 and permits coupling between projection chamber 14 and positional interface 16. Receiving interface 29 also permits containment and protection of display device 10 components that do not entirely fit within projection chamber 14, or components that require spatial arrangements outside of projection chamber 14. In embodiments, receiving interface 29 comprises the same material as projection chamber housing 32 and extends the interior projection chamber provided by projection chamber housing 32.

Positional interface 16 allows projection chamber 14 to be moved relative to base 12, and allows projection chamber 14 to maintain a constant position relative to base 12 after being moved. Thus, positional interface 16 allows a user to point or aim projection chamber 14 and manipulate the position of an output image projected by display device 10 with ease. In embodiments, positional interface 16 comprises a ball and socket combination that permits relative rotational movement between projection chamber 14 and base 12. In other embodiments, positional interface 16 comprises corrugated metal tubing that is sufficiently rigid to hold a position for projection chamber 14, while compliant enough for a user to bend the tubing to achieve a desired position and orientation for projection chamber 14.

Positional interface 16 couples to base 12 and couples to projection chamber 14. For the embodiments shown in FIG. 3, positional interface 16 comprises an upper end that attaches to projection chamber housing 32 and a lower end that attaches or couples to housing 20 of base 12. More specifically, a projection chamber housing 32 portion of receiving interface 29 allows attachment to upper end of positional interface 16, while a central portion of top wall 22a allows attachment to lower end of positional interface 16. As shown, positional interface 16 couples to projection chamber housing 32 at a location between an aft end of projection chamber 14 and a forward end that includes output optical projection lens 37.

In embodiments, upper end of positional interface 16 couples at a location relatively close to a center of mass of projection chamber 14 to minimize mechanical moments transmitted onto base 12, e.g., those resulting from a displacement of center of mass of projection chamber 14 away from a center of mass for base 12. In other embodiments, base 12 includes a recessed groove in top wall 22a that allows positional interface 16 to be folded or collapsed down into top wall 22a, thereby decreasing the profile of display device 10 during non-use.

Figure 4:
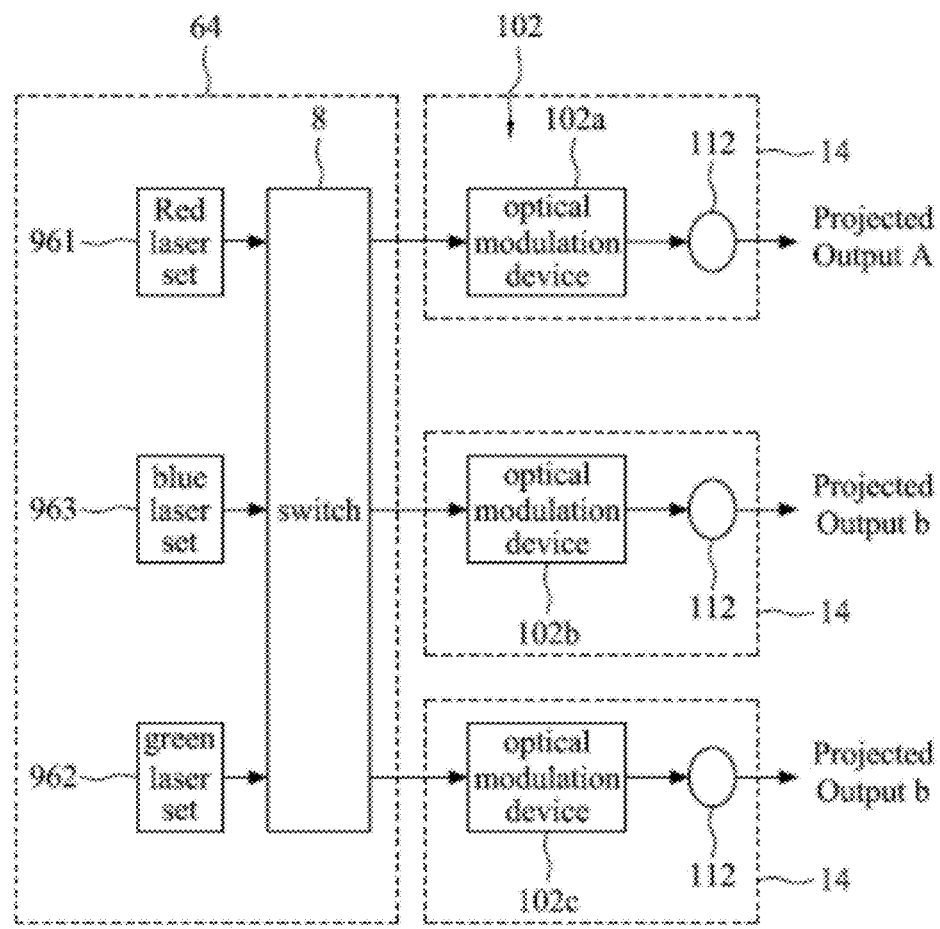
FIG. 4 is an example schematic chart showing a switch diverting light beams from light source into different projection outputs in accordance with embodiments.

FIG. 4 illustrates an example schematic chart illustrating optical path from a light source 64 configured in base 12 (FIG. 3) to multiple projection outputs 107 such as each projection chamber 14 in accordance with one of the present embodiments. Light source 64 includes a plurality of laser sets, such as a red laser set 961, a green laser set 962 and a blue laser set 963, generating a plurality of laser beams with different color to one another, such as red laser beam, green laser beam and blue laser beam. As shown, light source 64 may include a switch 8 which receives the red laser beam, green laser beam and blue laser beam from the red laser set 961, the green laser set 962 and the blue laser set 963 respectively.

In embodiments, display device 10 comprises three projection chambers 14. Each of the projection chambers 14 includes an optical modulation device 102 and a projection lens system 112. The optical modulation device 102 is configured to selectively transmit light generated by the light source according to a receiving video data. The projection lens system 112 is configured to output light transmitted by the optical modulation device 102 along a predetermined projection path, so as to display projection images on one or more external receiving surfaces.

The switch 8 is capable of diverting the red laser beam, the green laser beam and the blue laser beam in a predetermined sequential order to each of the three projection chambers 14. For instance, in embodiments, there are three modes corresponding to a first time frame, a second time frame and a third time frame, respectively.

In the first mode, during the first time frame, red laser beam is transmitted from switch 8 to optical modulation device 102a; green laser beam is transmitted from switch 8 to optical modulation device 102b; blue laser beam is transmitted from switch 8 to optical modulation device 102c.

In the second mode, during the second time frame, red laser beam is transmitted from switch 8 to optical modulation device 102c; green laser beam is transmitted from switch 8 to optical modulation device 102a; blue laser beam is transmitted from switch 8 to optical modulation device 102b.

In the third mode, during a third time frame, red laser beam is transmitted from switch 8 to optical modulation device 102b; green laser beam is transmitted from switch 8 to optical modulation device 102c; blue laser beam is transmitted from switch 8 to optical modulation device 102a.

Lasting time of the first time frame, the second time frame and the third time frame may be identical to one another in embodiments. Namely, the first mode, the second mode and the third mode take turns evenly to be applied in the light source 64. In some other embodiments, lasting time of the first time frame, the second time frame and the third time frame may differ from one another according to system requirement. Such adjustment toward lasting time may be used as color control manner of the display device 10.

Figure 5:
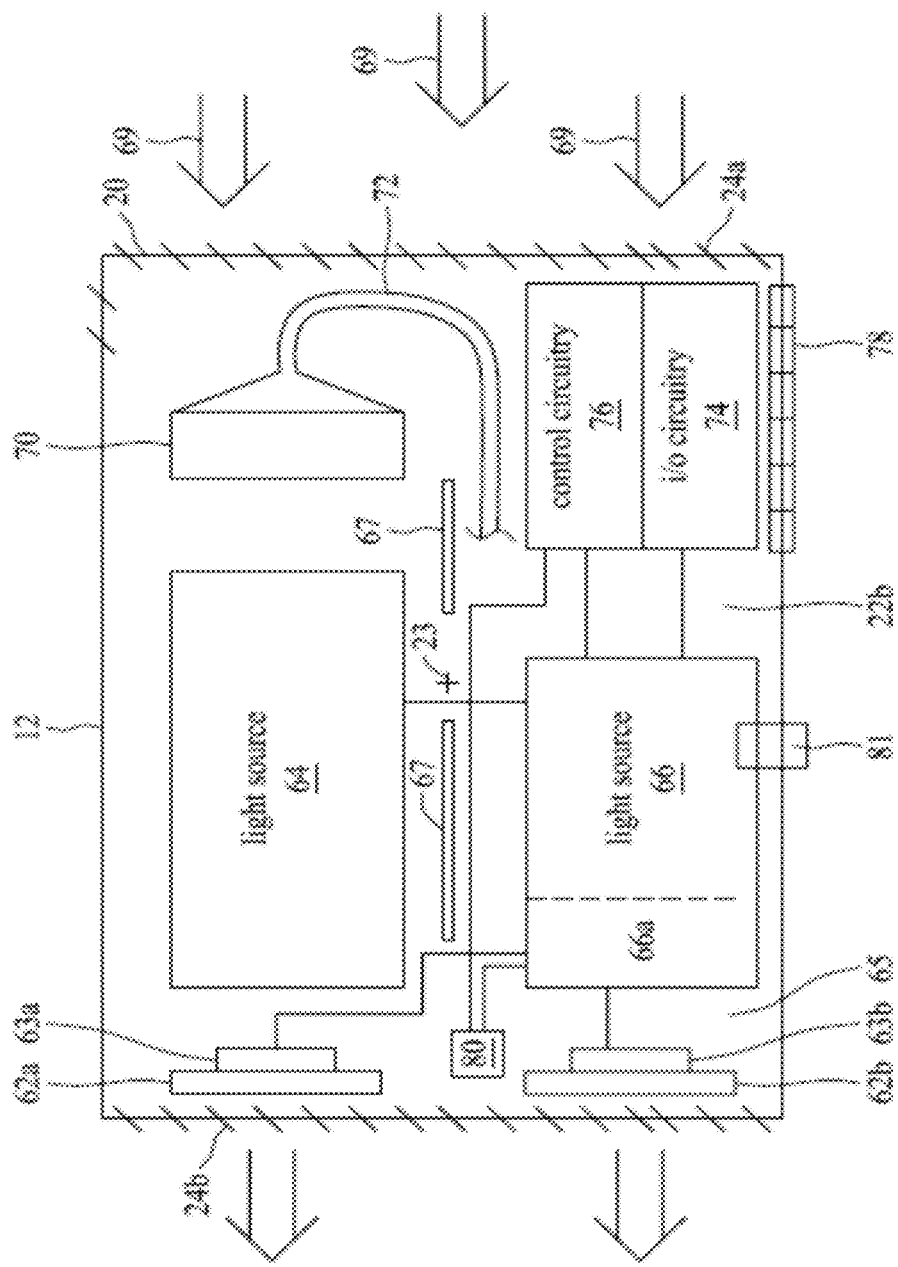
FIG. 5 illustrates a simplified schematic of components within base of a display device in accordance with embodiments.

FIG. 5 illustrates a simplified top view schematic of components within base 12 in accordance with some embodiments. A light source chamber 65 is defined in volume and shape by inside walls 22a-f of base 12. Light source chamber 65 comprises fans 62a and 62b, light source 64, power supply 66, fiber-optic interface 70, fiber-optic cable 72, input/output circuitry 74, control circuitry 76, and input/output interfaces 78.

In embodiments, base 12 is designed or configured to maintain balance of display device 10. In this case, base 12 may be designed to maintain balance for any position of projection chamber 14 relative to base 12 while base 12 rests on a flat surface. Thus, components within base 12 may be arranged and situated such that they cumulatively provide a center of mass 23 relatively close to a geometric center for a footprint of base 12. As shown, light source 64 and power supply 66, which are typically the heaviest components in base 12, are disposed relatively central to the footprint in one dimension and on opposite sides of center of mass 23 in the other dimension. In embodiments, components within base 12 are arranged within base 12 according to their weight in order to substantially balance moments about a center of mass 23. The exact position of each component will depend of on the number and type of components and base 12 layout. In addition, housing 20 may be sized to provide a wide enough footprint to balance moments produced by positions and orientations of projection chamber 14 away from a center of mass 23 for base 12.

Fans 62a and 62b move air through light source chamber 65 for cooling components within light source chamber 65. In embodiments, fans 62a and 62b draw air in through inlet air vents 24a on one side of base 12 and exhaust heated air out of exhaust air vents 24b after the air has cooled internal components of base 12 and walls of housing 20. One skilled in the art will appreciate that fans 62a and 62b, inlet air vents 24 and exhaust air vents 24b placement will vary with internal component placement within light source chamber 65. Specifically, fan 62a and 62b placement, and airflow patterns effected by fans 62 within light source chamber 65, is designed according to individual temperature regulation requirements and heat generation contributions of components within base 12. Light source 64 and power supply 66 generate the largest proportion of heat within base 12, while control circuitry 76 and input/output circuitry 74 call for tighter temperature regulation. Correspondingly, inlet air 69 passes in through inlet air vents 24a, initially passes and cools control circuitry 76 and input/output circuitry 74 while the air is relatively cool, passes across power supply 66 and light source 64, and exits out exhaust air vents 24b. The exhaust air may also cool fan motors 63a and 63b, which rotate fans 62a and 62b, respectively. In embodiments, multiple fans are used to permit a lower profile for base 12.

It is to be understood that the number and size of fans used will depend on heat generation within display device 10 and a desired air flow to maintain one or more heat dissipation goals. Light source chamber 65 may also include one or more vertical or horizontal airflow guides 67 within light source chamber 65 to direct and distribute airflow as desired. In embodiments, light source 64 comprises one or more diode laser arrays and one or more circuit boards to power and control the diode lasers. In this case, airflow guides 67 are arranged to direct cooling air across the surfaces of each circuit board. As will be described in further detail below, fans 62a and 62b may also be responsible for drawing air through positional interface 16 and to or from projection chamber 14 to cool the optical modulation device included therein.

Figure 6:
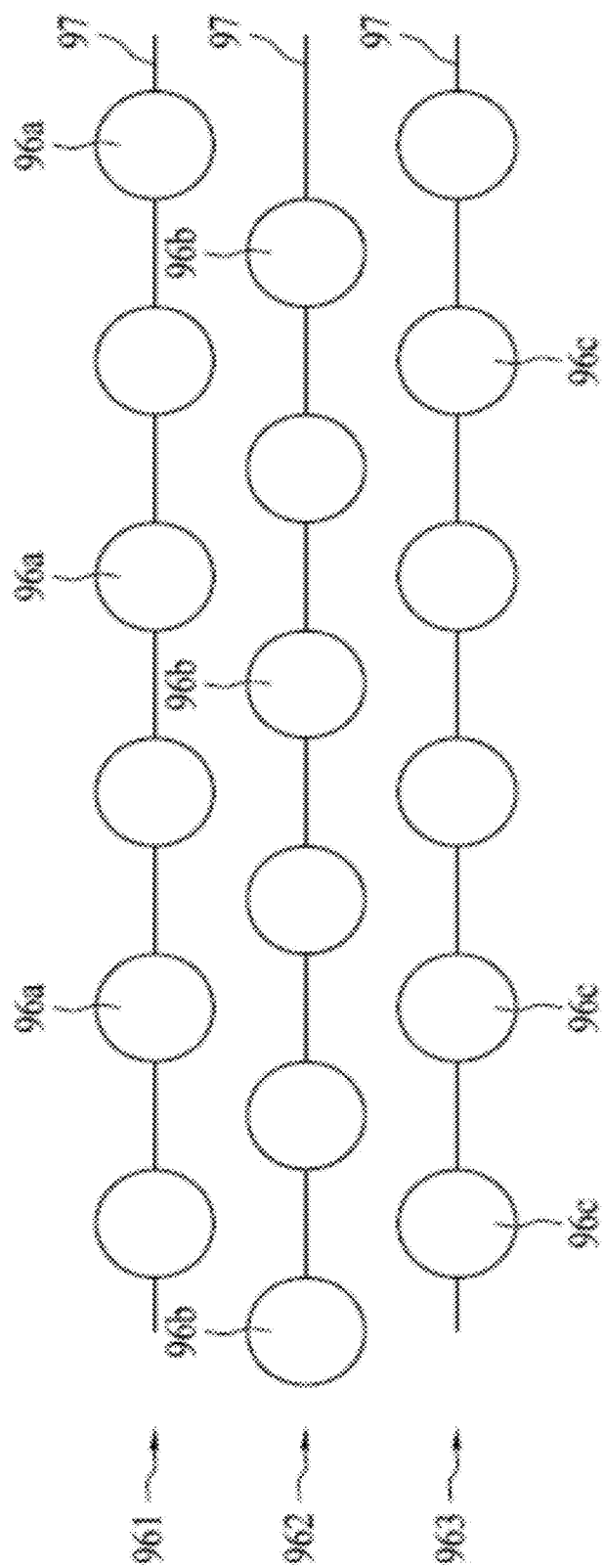
FIG. 6 illustrates simplified front view of an example light source configuration in accordance with embodiments.
Figure 7:
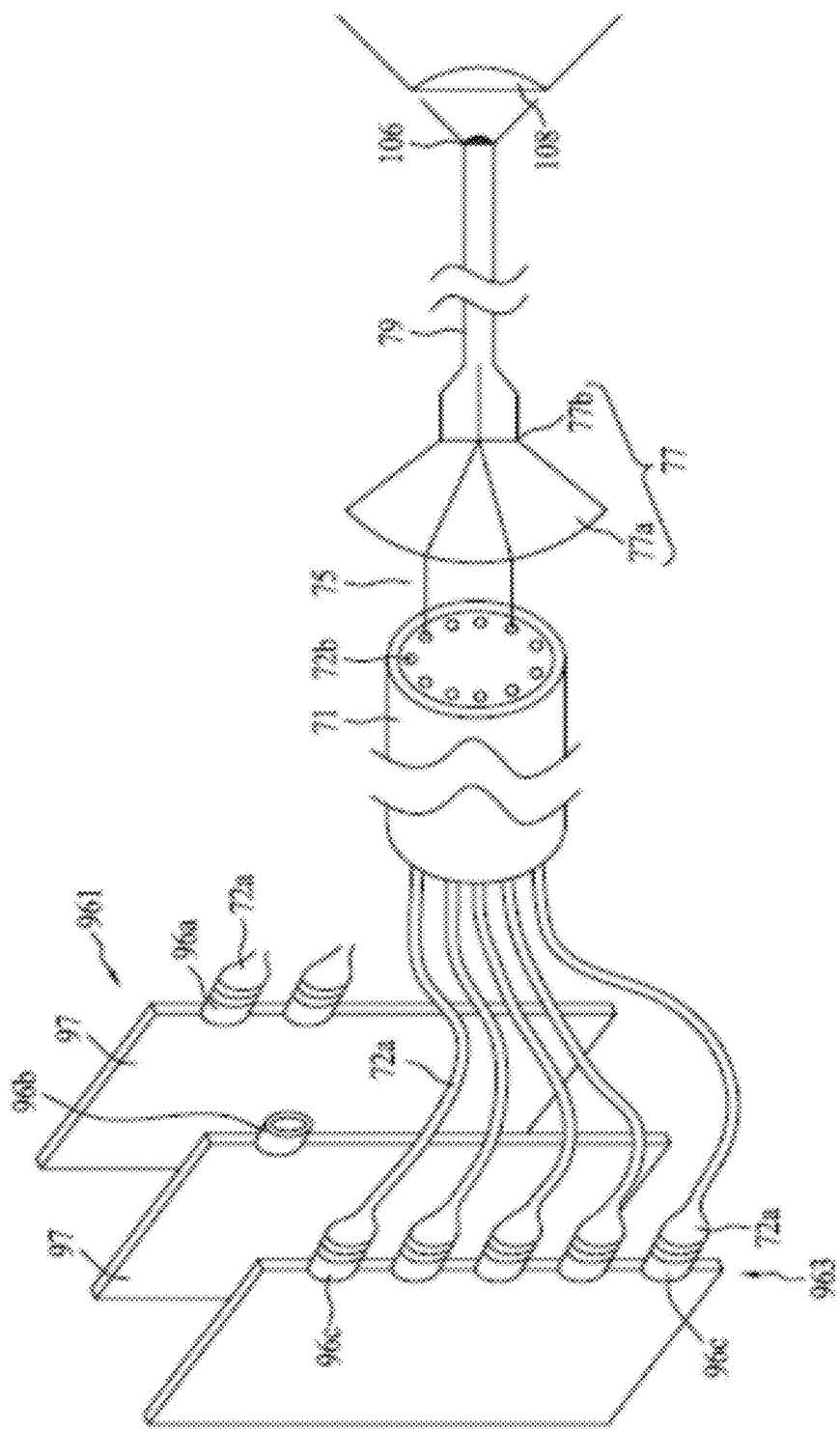
FIG. 7 illustrates a simplified top perspective view of an example light source configuration in accordance with embodiments.

FIGS. 6 and 7 illustrate simplified front and top perspective views, respectively, of a light source configuration in accordance with some embodiments. In this case, light source chamber 65 includes an array of lasers that generate collimated light. Lasers may comprise any combination of diode lasers and/or diode pumped solid-state (DPSS) lasers, for example. The collimated light produced by a diode laser differs from radiant light and is characterized by light that is output with about the same output direction, and significantly in phase.

The array of lasers may comprise one or more red diode lasers 96a, one or more green diode lasers 96b, and one or more blue diode lasers 96c. A red laser set 961 comprises a plurality of red diode lasers 96a. A green laser set 962 comprises a plurality of green DPSS lasers 96b. A blue laser set 963 comprises a plurality of blue diode lasers 96c. The number and power of lasers for each color is scaled according to a desired light intensity output for display device 10 and according to the light sensitivity of a viewer to each color. Each laser diode is installed on a circuit board 97, which mounts, and provides electrical control for each laser diode installed thereon. Multiple lasers may be mounted on a single board 97 to reduce space occupied by light source 64. Including multiple lasers for a single color allows output luminosity of display device 10 to vary with the number of lasers turned on for each color, and allows for redundant control of light generation by lasers. Thus, one or more of the lasers may be turned off if less light intensity is desired, longevity of individual lasers benefits from periodic shut-down, or power conservation for display device 10 is preferred.

Figure 8:
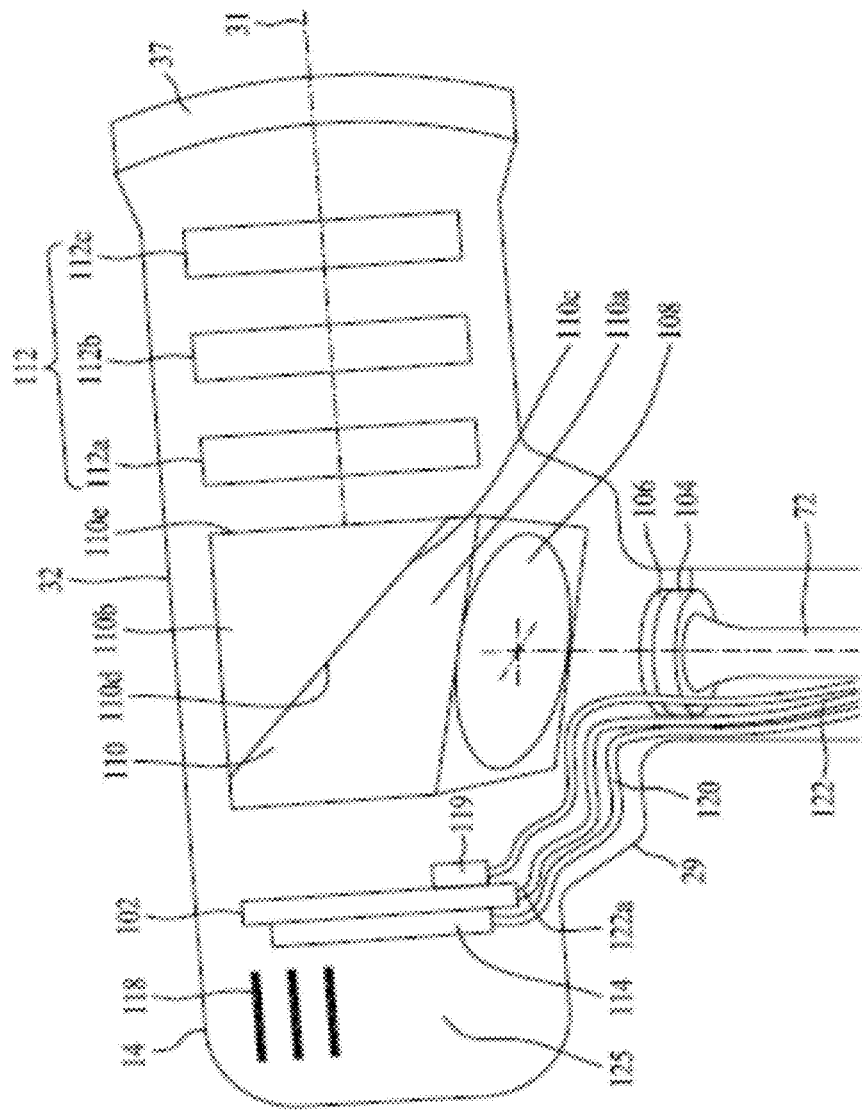
FIG. 8 shows a simplified side view of projection components in accordance with aspects of the innovation.

Referring to FIG. 8, in embodiments, light output from the lasers is provided to fiber-optic cabling 72. Fiber-optic cabling 72 includes one or more fiber optic cables that transmit light from each laser along multiple or common optical paths to relay optics system 106 and 108 disposed along a light path between an exit end of fiber-optic cabling 72 and an optical modulation device 102.

Referring again to FIG. 7, each cable 72 has an inlet end 72a that receives light from a red laser 96a, a green laser 96b or a blue laser 96c; and each cable 72 also has an outlet end 72b that outlets the laser light for transmission to relay optics 106 and 108, and subsequent transmission to optical modulation device 102. Since fiber-optic cabling 72 may be bent and flexibly positioned, fiber-optic cabling 72 advantageously allows light transmission between lasers and relay optics system regardless of the positioning and orientation between the lasers and optics system. For example, this allows flexible arrangement of lasers, relay optics 106 and 108 and prism 110 (FIG. 8), which may be used to improve space conservation within base 12, decrease the footprint of base 12, and minimize display device 10 size. In addition, flexible fiber-optic cabling 72 also allows positional interface 16 to move without compromising light provision to the optical modulation device in projection chamber 14.

The number of fiber optic cables in cabling 72 will vary with design. Multiple fiber-optic cables may be employed in a design where each cable services one or more colors to the switch and one cable from the switch to each optical modulation device. As shown in FIG. 7, light from red laser 96a, green laser 96b or blue laser 96c is first transmitted into a fiber-optic cable dedicated to each color; and subsequently routed by the switch into a common fiber-optic cable 71. In embodiments, each fiber-optic cable attaches directly to an individual laser. For example, each fiber-optic cable may include a fixture with an inner threaded interface that matches a threaded interface disposed on an outside surface of a laser housing. Commercially available fiber-optic cables, such as that available from Ocean Optics Inc. of Dunedin, Fla., may come standard with such coupling and alignment fixtures. In embodiments, a short focal length normal or GRIN lens is mounted at the inlet end of each cable to facilitate laser-to-fiber light transition and collimated transfer into cable.

Junction 75 permits transmission of light from fiber-optic cables 72 into converging optics 77, and into common fiber-optic cable 79. Converging optics 77 redirect incoming light from each fiber-optic cable into common fiber-optic cable 79 and comprise a converging lens 77a that redirects light toward re-collimating lens 77b, which collimates and re-directs incoming laser light from converging lens 77a into common optical fiber 79. Although not shown, junction 75 may also include a rigid structure, such as a suitably dimensioned molded plastic, that fixtures (e.g., holds and positions) fiber-optic cables and common fiber-optic cable 79. In embodiments, junction 75 comprises an optical adhesive that adheres cables directly to converging lens 77a. In other embodiments, at the outlet end 72b, the fiber-optic cables are combined into a larger cable that contains multiple fibers. Multiple fiber cables, such as fiber ribbon-based cables and those that employ multiple fibers located circumferentially within a round tube, are commercially available from a variety of vendors.

Multiple fiber-optic cable designs may be employed where each cable transmits a primary color. For example, three fiber-optic cables may be employed in which each cable transmits light from a primary color set of lasers along three different optical paths to three primary colors dedicated optical modulation devices.

Referring again to FIG. 5, inner light chamber 65 may also employ other light source arrangements to generate light for display device 10. Some light source arrangements, for example, may comprise an array of radiant light emitting diodes, characterized by radiant, non-lasing or non-collimated light generation. Similar to diode and DPSS lasers, radiant light emitting diodes consume less power and generate less heat than a white light lamp, and also emit colored light and thereby may operate without a color wheel. Light chamber 65 may also include one or more dichroic mirrors in white light generation assemblies to separate red, green and blue light for transmission within fiber optic cables 72 to color dedicated optical modulation devices, such as three liquid crystal display (LCD) valves employed for red, green and blue control.

Power supply 66 is configured provide to electrical power to light source 64 and other components within display device 10 that rely on electrical power. Thus, power supply 66 provides electrical energy to control circuitry 76, input/output circuitry 74, fans 62a and 62b, power diode 80 and components within projection chamber 14 such as optical modulation device 102 (FIG. 8). Power diode 80 is in electrical communication with an external power switch 82 and may illuminate when display device 10 is turned on to indicate whether display device 10 is on or off. A power cord port 81 receives a power cord, which couples power supply 66 to an AC power source such as a wall power supply. In embodiments, conversion of AC power to DC power occurs in a transformer included between ends of the power cord, as is common with many laptop computer power cords, thereby reducing the size of power supply 66, base 12 and display device 10 and increasing portability of display device 10. Circuitry within power supply 66 may then convert incoming power to one or more DC voltages for specific components in display device 10.

In other embodiments, power supply 66 comprises at least one rechargeable battery 66a. Battery 66a may be recharged using power provided through inlet port 81. Battery 66a allows display device 10 to operate on stored energy and without reliance on proximity to an AC power source, which further increases portability of display device 10. For example, inclusion of a battery in base 12 extends usage into a car, library, coffee shop, remote environment, or any other setting where AC and fixed power outlets are not readily available or within reach.

At least one fiber-optic cable 72 transmits light from light source 64 to relay optics disposed along a light path between an exit end of fiber-optic cable 72 and optical modulation device 102 (FIG. 8) in projection chamber 14. With respect to device 10 structure, fiber-optic cable 72 transmits light from one compartment to a separate compartment, namely, from light source chamber in base 12 to projection chamber 14. The number of fiber optic cables will vary with design. As mentioned above, multiple fiber-optic cables may be employed in a laser light generation design, for example, where each fiber-optic cable 72 services one or more diode lasers. Alternatively, each fiber-optic cable 72 may service a primary color. For example, one fiber-optic cable may be used to transmit sequentially controlled red, green and blue generated by a diode laser array and transmitted along a single light path to a single minor-based optical modulation device. Three fiber-optic cables may be employed to transmit light from a laser array that outputs red, green and blue light into three fiber-optic cables, to three optical modulation devices that are each dedicated to modulation of a primary color.

Fiber-optic interface 70 facilitates transmission of light from each laser into fiber-optic cabling 72. Fiber-optic interface 70 may include one or more fixtures that position and hold an inlet end for each fiber-optic cable included in fiber-optic cabling 72 such that light output from the light source transmits into a fiber-optic cable. Fiber-optic interface 70 may also include optics that direct light from lasers into fiber-optic cabling 72. In embodiments, a single fiber-optic cable is used in cabling 72 and fiber-optic interface 70 includes a lens system disposed between the outlet of a lamp or each laser and the inlet of the single fiber-optic cable to direct light into the cable. The lens system may comprise at least two lenses:

a first lens to direct the light towards the fiber entrance and a second lens that collimates light entering the cable. In other embodiments that implement a one-to-one laser to fiber-optic cable relationship; fiber-optic interface 70 holds the inlet end for each fiber-optic cable relatively close to the outlet of each laser to receive light therefrom. Each cable in this case may include a converging lens at its inlet end that facilitates light capture and transmission into a cable.

In another one-to-one design, each fiber-optic cable in fiber-optic cabling 72 includes a fixture that permits attachment to another object. For example, conventionally available fiber-optic cables available from vendors such as Ocean Optics Inc. of Dunedin, Fla. include a detachable fixture with a thread that allows screwing and fixing of the fiber-optic cable to a mating thread disposed on a laser housing. In this case, fiber-optic interface 70 comprises the threaded fixture from each cable and the mating thread on the laser.

In some cases, a projection device with multiple outputs may be operated in single output mode. In single path embodiments where red, green and blue lasers transmit colored light to a single optical modulation device along a single fiber-optic cable, switch 105 and fiber-optic interface 70 receives colored light from each colored laser, in turn, according to timed control signals provided to the lasers by control circuitry 76.

Input/output circuitry 74 provides an interface between control circuitry 76 and one or more input/output interfaces 78. Input/output interfaces 78 are configured to receive at least one cable, wire, or connector, such as a cable for transmitting a video signal comprising video data from a digital computing device. Common ports suitable for use with input/output interfaces 78 include ports that receive S video cable, 6-pin mini DIN, VGA 15-pin HDDSUB female, an audio cable, component RCA through an S-Video adaptor, composite video RCA cabling, a universal serial bus (USB) cable, fire wire, etc. Input/output interfaces 78 may also include an audio output port for wired connection to speakers employed by a headphone or speaker system.

Control circuitry 76 provides control signals to components of display device 10. In embodiments, control circuitry 76 provides control signal to components not within base 12 by routing data from input/output circuitry 74.

Control circuitry 76 may provide control signals to light source 64 that determine when light source 64 is turned on/off. In addition, circuitry 76 may include memory that stores instructions for the operation of components within display device 10. For example, circuitry 74 may provide control signals to control fans 24 according to stored heat regulation instructions. One or more sensors may also be disposed within base 12 to facilitate thermal regulation. For example, a temperature sensor may be disposed proximate to circuitry 74 and 76 to monitor temperature levels and participate in closed loop temperature control within base 12 as controlled by control circuitry 76.

Input/output circuitry 74 and input ports 78 collectively permit communication between display device 10 and a device that outputs a video signal carrying video data. For example, desktop computers, laptop computers, personal digital assistants (PDAs), cellular telephones, video game consoles, digital cameras, digital video recorders, DVD players, and VCRs, may all be suitable to output video data to display device 10. Video data provided to control circuitry 76 may be in an analog or digital form. In some cases, input/output circuitry 74 and control circuitry 76 convert analog video signals into digital video signals suitable for digital control of an optical modulation device included in display device 10, such as a liquid crystal display "LCD" device or a digital micromirror "DMD" device. Thus, input/output circuitry 74 or control circuitry 76 may also include support software and logic for particular connector types, such as processing logic required for S-video cabling or a digital video signal. Control circuitry 76 may also include and access memory that facilitates conversion of incoming data types and enhances video compatibility of display device 10. Suitable video formats having stored conversion instructions within memory accessed by control circuitry 76 may include NTSC, PAL, SECAM, EDTV, and HDTV (1080i and 720p RGBHV), for example.

When lasers are used for light generation within light source 64, as described above, control circuitry 76 receives video data included in a signal via one or more input ports 78 and input/output circuitry 74, converts the data to color frame sequential data, and synchronizes the frame sequential data for delivery to each optical modulation device 102 and to each laser 96. In a single, double or triple path design between lasers 96, switch, and the optical modulation device where optical fibers transmit red, green and blue light in a time controlled sequential order to each optical modulation device, this includes synchronizing the timing of data sent to the optical modulation device and on-off commands sent to lasers 96. It is to be understood that circuitry, e.g., control circuitry, is not intended to be limited to hardware only. Rather the circuitry, or controller, is intended to include hardware, software or combinations of hardware and software.

Figure 9:
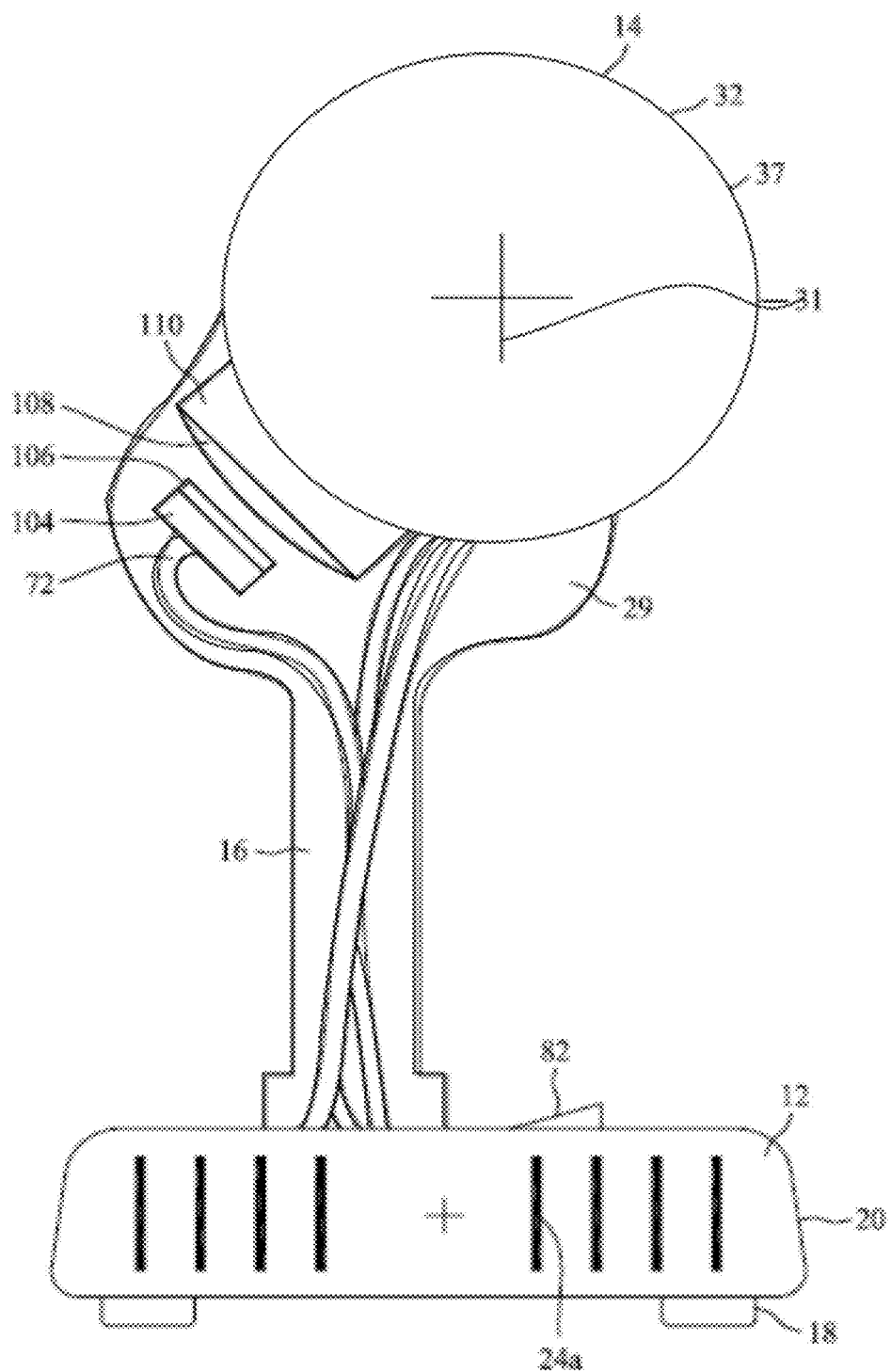
FIG. 9 illustrates a front view of a projection display device with positional interface and lower portion cutaway.

FIG. 8 shows a simplified side view illustration of components within projection chamber 14 of FIG. 3, taken through a vertical midpoint of chamber 14 along its cylindrical axis, in accordance with some present embodiments. FIG. 9 shows a front view illustration of display device 20 with positional interface 16 and lower projection chamber 29 cutaway to show components therein. Projection chamber 14 comprises optical modulation device 102, fiber-optic interface 104, relay optics 106 and 108, prism structure 110, projection lens system 112, control and power cabling 120, and air duct 122.

Fiber-optic cabling 72 attaches to a fiber-optic interface 104 and outputs light to relay optics 106. In embodiments, fiber-optic interface 104 secures fiber-optic cabling 72 such that slack is provided for fiber-optic cabling 72 between attachment at fiber-optic interface 104 and attachment within base 12. The slack allows fiber-optic cabling 72 to deflect with positional interface 16 for various positions of projection chamber 14 relative to base 12.

Together, fiber-optic cabling 72 and fiber-optic interface 104 direct light generated by light source 64 to prism 110. In embodiments, fiber-optic cabling 72 and interface 104 are configured with respect to prism 110 so as to provide an optical path of incident light that is about perpendicular to an incident surface of prism 110. Some digital micro-minor light modulator designs require that incoming light be incident on the light modulator from either above or below its light reflecting surface to allow light output along projection path 31.

Receiving interface 29 of projection chamber housing 32 and fiber-optic interface 104 ease this requirement and allow a designer to arrange fiber-optic cabling 72 and fiber-optic interface 104 within receiving interface 29 such that fiber-optic interface 104 directs light at a particular desired angle relative to prism 110, and onto optical modulation device 102. For example, fiber-optic interface 104 may be coupled to receiving interface 29 to provide an incident light path that is perpendicular onto an incident surface of prism 110 and has a 45 degree angle relative to optical modulation device 102, e.g., prism 110 is rotated 45 degrees about projection path 31. Attachment between interface 104 and housing 29 maintains the desired incoming light angle despite changing positions of fiber-optic cabling 72 along its length caused by repositioning of positional interface 16.

Relay optics 106 and 108 convert light receive from fiber-optic cabling 72 to light suitable for transmission into prism structure 110 and onto optical modulation device 102. This may include shaping and resizing light flux received from fiber-optic cabling 72 using one or more lenses.

In other embodiments, display device 10 comprises a pair of fly-eye lenses arranged in the optical path between light source 64 and prism 110. Cumulatively, the pair of fly-eye lenses uniformly distributes light received from fiber-optic cabling 72 to the flux transmitted upon optical modulation device 102. In embodiments, the pair of fly-eye lenses are arranged on either and a fiber-optic cabling 72. The first fly-eye lens is disposed at fiber-optic interface 70 within base 12, receives light from a lamp or diode laser array, and spatially divides the entire input light flux into a set of blocks or components that each comprises a portion of the total area of the inlet flux. Light for each block or component then travels down its own fiber-optic cabling 72. The second fly-eye lens comprises the same number of blocks or components and is disposed at relay lens 106. The second fly-eye lens receives a fiber-optic cable for each block or component and outputs light for each component such that the light from each component is expanded to span the downstream dimensions of optical modulation device 102 and the projected image.

Prism structure 110 is an optical modulation system that provides light to optical modulation device 102 at predetermined angles. Prism structure 110 also transmits light from optical modulation device 102 to the projection lens system 112 along projection path 31. Prism structure 110 comprises prism components 110a and 110b that are separated by air space or bonding interface 110c. Interface 110c is disposed at such an angle so as to reflect light provided from fiber-optic cables 72, and intermittent relay optics, towards optical modulation device 102. In addition, interface 110c allows light reflected by optical modulation device 102 to transmit to projection lens system 112 along projection path 31.

Optical modulation device 102 is configured to selectively transmit light to provide an output image along projection path 31. To do so, optical modulation device 102 is supplied with video data included in a video signal and selectively transmits light according to the video data. The video data is typically provided to device 102 on a frame by frame basis according to individual pixel values. If the video data is not received by display device 10 in this format, control circuitry 76 in base 12 may convert the video data to a suitable format for operation of optical modulation device 102. In embodiments, individual light modulation elements within optical modulation device 102, which each correspond to an individual pixel on the output image, translate received digitized pixel values into corresponding light output values for each pixel.

In embodiments, optical modulation device 102 is a minor based optical modulation device, such as a digital micro minor device (or DMD, a trademark of Texas instruments Inc.) commercially available from Texas Instruments, Inc. In this case, optical modulation device 102 comprises a rectangular array of tiny aluminum micromechanical mirrors, each of which individually deflects about a hinged axis to selectively reflect output image light down projection path 31, and reflect non-image light away from projection path 31. The deflection state or angle of each mirror is individually controlled by changing memory contents of an underlying addressing circuit and mirror reset signal. The array of minors is arranged such that each minor is responsible for light output of a single pixel in the video image. Control signals corresponding to pixel output are supplied to control electrodes disposed in the vicinity of each mirror, thereby selectively deflecting individual minors by electromagnetic force according to video data on a pixel by pixel basis. Light reflected by each mirror is then transmitted along projection path 31, through prism structure 110, and out of projection chamber 14 using projection lens system 112.

A controller 114 is included with optical modulation device 102 and provides control electrical signals that direct each micromechanical minor to desired light reflecting states corresponding to pixel video data for each pixel. Control and power cabling 120 provides electrical communication between controller 114 and control circuitry 76 in base 12 (FIG. 3). Thus, at least one electrical connector included in cabling 120 couples to controller 114 in projection chamber 14 and to control circuitry 76 in base 12 and provides electrical communication therebetween. A power line within cabling 120 extends between optical modulation device 102 in projection chamber 14 and power supply 66 in base 12 and provides power from power supply 66 to device 102. Control and power cabling 120 then travels through positional interface 16, which includes one or more holes or apertures that allow control and power cabling 120 to pass therethrough without impingement on control and power cabling 120 for any position of projection chamber 14. In embodiments, control and power cabling 120 passes through a plastic tube in positional interface 16 to further protect the wires.

The illumination angles for optical modulation device 102 are set by the output direction of fiber-optic interface 102, arrangement of relay optics 106 and 108, and the faces of prism structure 110. After light reflection by individual minors of optical modulation device 102, reflected light exits prism structure 110 towards lenses 112 along projection path 31.

Vents 118 are disposed on an aft portion of projection chamber housing proximate to optical modulation device 102. An air duct 122 includes a high-pressure end proximate to optical modulation device 102 and controller 114, and a low pressure end disposed within base 12. As mentioned above, fans 62a and 62b may draw air from within base 12 and exhaust the air out exhaust vents 24b, which creates a negative pressure within base 12 relative to the ambient room or surroundings. Correspondingly, fans 62a and 62b create a negative pressure for the end of air duct 122 within base 12 relative to the opposite end in projection chamber 14, which would otherwise rest at room pressure due to vents 118. By disposing one end of air duct 122 within base 12 and the other end in a space 125 around optical modulation device 102, fans 62 thus draw air from the space 125 and cool optical modulation device 102. Cumulatively, cooling air is drawn from the ambient surroundings around projection chamber 14, through vents 118 and into a space 125 surrounding optical modulation device 102, into duct 122 at end 122a, through duct 122, out duct 122 at end 122b, into base 12, and out air vents 24b. Fans 62 maintain end 122b at a low pressure relative to end 122a, and thus providing cooling for optical modulation device 102.

A projection lens system 112 is disposed along projection path 31 for outputting light transmitted by the optical modulation device along projection path 31. Projection lens system 112 manipulates image light transmitted by optical modulation device 102 along projection path 31 such that a projected image cast on a receiving surface enlarges as distance from output optical projection lens 37 to the receiving surface increases. Projection lens system 112 comprises lenses 112a, 112b, 112c and output optical projection lens 37, each of which are disposed centrically along and orthogonal to projection path 31. Distances between each lens may vary with a desired splay angle from output optical projection lens 37, as may the number of lenses used. In embodiments, display device 10 is designed for a short throw distance, such as between about six inches and about fifteen feet. Display device 10 may also include one or more buttons or tools that allow a user to manually focus and manually zoom output from projection lens system 112. Projection chamber 14 may also include a lens between optical modulation device 102 and prism 110 that converges image light reflected by device 102 towards projection path 31. This allows a reduction in output lens 112 diameters, and a corresponding reduction in diameter and size for projection chamber 14.

In some other embodiments, other types of light modulators and light path designs may be employed. For example, fiber-optic cabling 72 may be arranged for a multiple light path design to transmit light to three primary color dedicated LCD optical modulators, or to three primary color dedicated DMD optical modulators. In the case of an LCD optical modulation device, selective transmission of light comprises selective passage of light through a liquid crystal medium on a pixel by pixel basis.

In addition, although base 12 of FIG. 3 has been primarily described with respect to components dedicated to projection functionality, it is understood that base 12 may be inclusive in a larger system, or comprise components not directed solely to display device 10 output. For example, base 12 may be part of a computer housing that includes components for projection functionality and components for computer functionality in a computer system, such as a desktop computer or video game console. Computer functionality components may include a processor, a hard drive, one more interface and control boards, a disk or floppy drive, etc. In this case, housing 20 is considerably larger to accommodate the combined functionality and components. In addition, some components may be shared, such as a power supply and fans used for movement of air within the housing.

Figure 10:
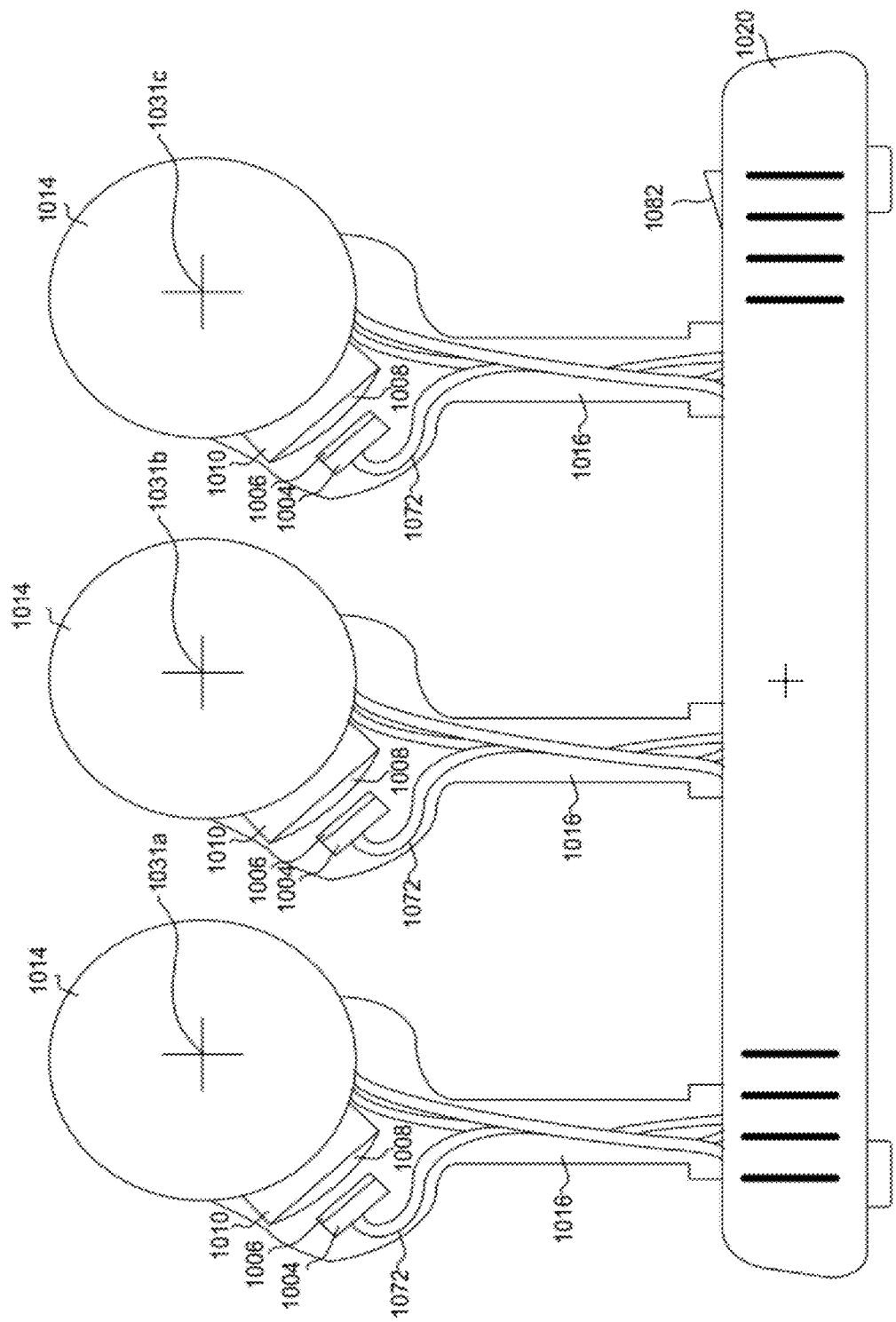
FIG. 10 illustrates a front view of an alternate embodiment of a projection display device with multiple positional interfaces.

FIG. 10 shows a front view illustration of display device 1020 with three positional interfaces 1016 for multiple light outputs from projection outputs 1014 in accordance with a non-limiting embodiment. The positional interfaces 1016 comprise fiber-optic interfaces 1004, relay optics 1006 and 1008, prism structures 1010. Fiber-optic cablings 1072 attaches to fiber-optic interfaces 1004 and output light to relay optics 1006. Together, fiber-optic cablings 1072 and fiber-optic interfaces 1004 direct light generated by the respective light sources to prisms 1010. In embodiments, fiber-optic cablings 72 and interfaces 1004 are configured with respect to prism 1010 so as to provide an optical path of incident light that is about perpendicular to an incident surface of prism 1010.

Fiber-optic interfaces 1004 allow a designer to arrange fiber-optic cablings 1072 and fiber-optic interfaces 1004 such that the fiber-optic interfaces 104 direct light at a particular desired angle relative to prism 1010. Relay optics 1006 and 1008 convert light receive from fiber-optic cablings 72 to light suitable for transmission into prism structures 1010. This may include shaping and resizing light flux received from fiber-optic cablings 72 using one or more lenses. In other embodiments, display device 1020 comprises a pair of fly-eye lenses arranged in the optical path between the light sources and prisms 1010.

Prism structures 1010 are optical modulation systems that provide light to optical modulation devices at predetermined angles. The illumination angles for the optical modulation devices are set by the output directions of the fiber-optic interfaces, arrangement of relay optics 1006 and 1008, and the faces of prism structures 1010. After light reflection by individual minors of the optical modulation devices, reflected light exits prism structures 1010 along projection paths 1031a, 1031b and 1031c, respectively, from the different positional interfaces 1016. In some other embodiments, other types of light modulators and light path designs may be employed. In the present embodiment, fiber-optic cablings 72 are arranged for a multiple light path design to transmit light from each of the outputs 1014.

Figure 11:
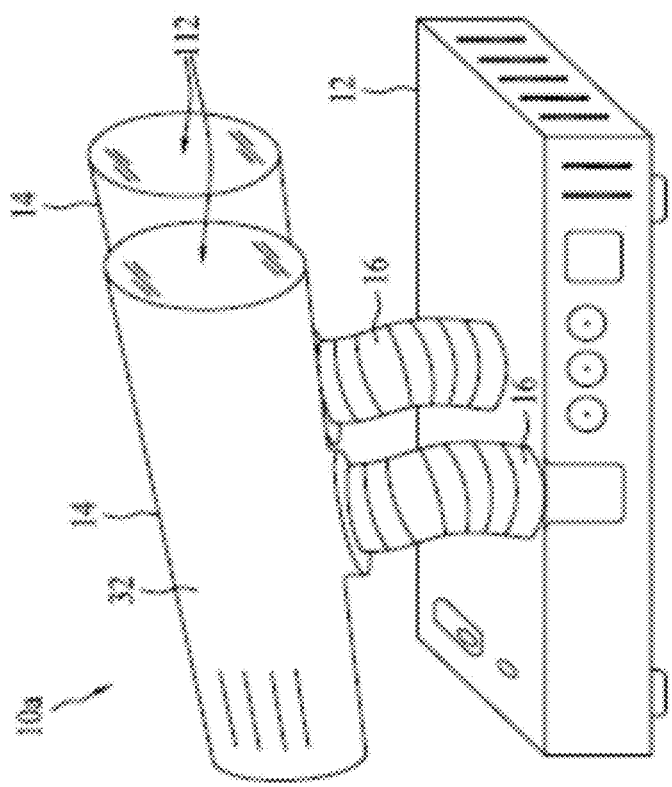
FIG. 11 illustrates an alternative perspective view of a display device in accordance with embodiments.

FIG. 11 illustrates a perspective view of a display device 10a in accordance with one of the present embodiments. As shown, display device 10a comprises a base 12, two projection chambers 14, and two positional interfaces 16.

Figure 12:
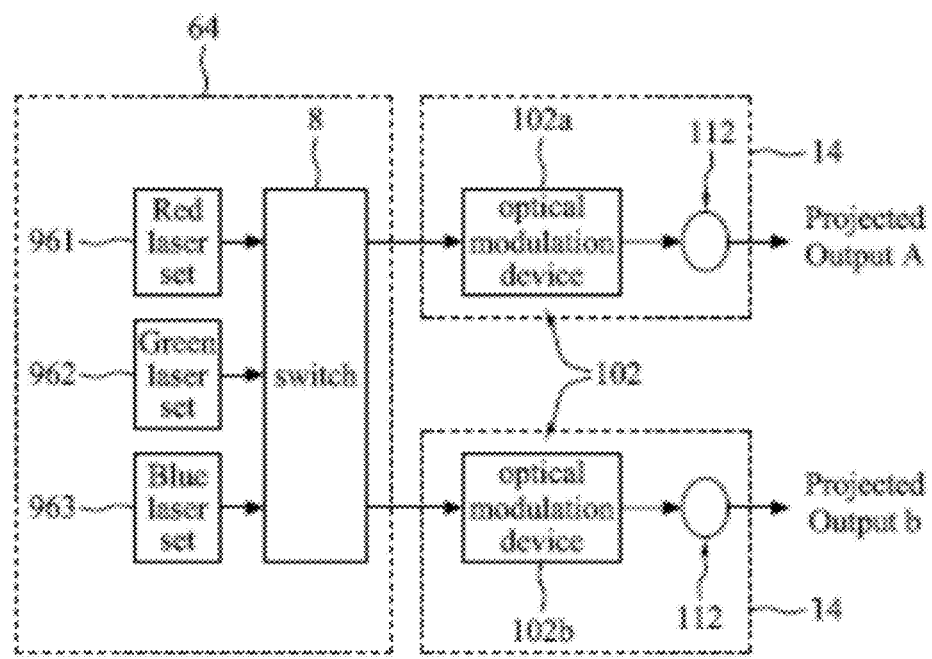
FIG. 12 illustrates an alternative schematic chart showing a switch diverting light beams from light source into different projection outputs in accordance with embodiments.

FIG. 12 illustrates a schematic chart illustrating optical path from a light source 64 configured in base 12 (FIG. 11) to each projection chamber 14. Light source 64 includes a plurality of laser sets, such as a red laser set 961, a green laser set 962 and a blue laser set 963, generating a plurality of laser beams with different color to one another, such as red laser beam, green laser beam and blue laser beam. As shown, light source 64 also includes a switch 8 which receives the red laser beam, green laser beam and blue laser beam from the red laser set 961, the green laser set 962 and the blue laser set 963 respectively.

In embodiments according to FIGS. 11 and 12, display device 10a comprises two projection chambers 14. Each of the projection chambers 14 includes an optical modulation device 102 and a projection lens system 112. The optical modulation device 102 is configured to selectively transmit light generated by the light source according to a receiving video data. The projection lens system 112 is configured to output light transmitted by the optical modulation device 102 along a predetermined projection path, so as to display projection images on one or more external receiving surfaces.

The switch 8 is capable of diverting the red laser beam, the green laser beam and the blue laser beam in a predetermined sequential order to each of the two optical modulation devices 102. For instance, in embodiments, there are three modes corresponding to a first time frame, a second time frame and a third time frame, respectively.

In the first mode, during the first time frame, red laser beam is transmitted from switch 8 to optical modulation device 102a; green laser beam is transmitted from switch 8 to optical modulation device 102b; and blue laser set 963 is turned off or stays in a low voltage stage which no laser light is generated In the second mode, during the second time frame, green laser beam is transmitted from switch 8 to optical modulation device 102a; blue laser beam is transmitted from switch 8 to optical modulation device 102b; and red laser set 961 is turned off or stays in a low voltage stage which no laser light is generated.

In the third mode, during a third time frame, red laser beam is transmitted from switch 8 to optical modulation device 102b; blue laser beam is transmitted from switch 8 to optical modulation device 102a; and green laser set 962 is turned off or stays in a low voltage stage which no laser light is generated.

Lasting time of the first time frame, the second time frame and the third time frame may be identical to one another in embodiments. Namely, the first mode, the second mode and the third mode take turns evenly to be applied in the light source 64. In some other embodiments, lasting time of the first time frame, the second time frame and the third time frame may differ from one another according to system requirement. Such adjustment toward lasting time may be used as color control manner of the display device 10a.

Figure 13:
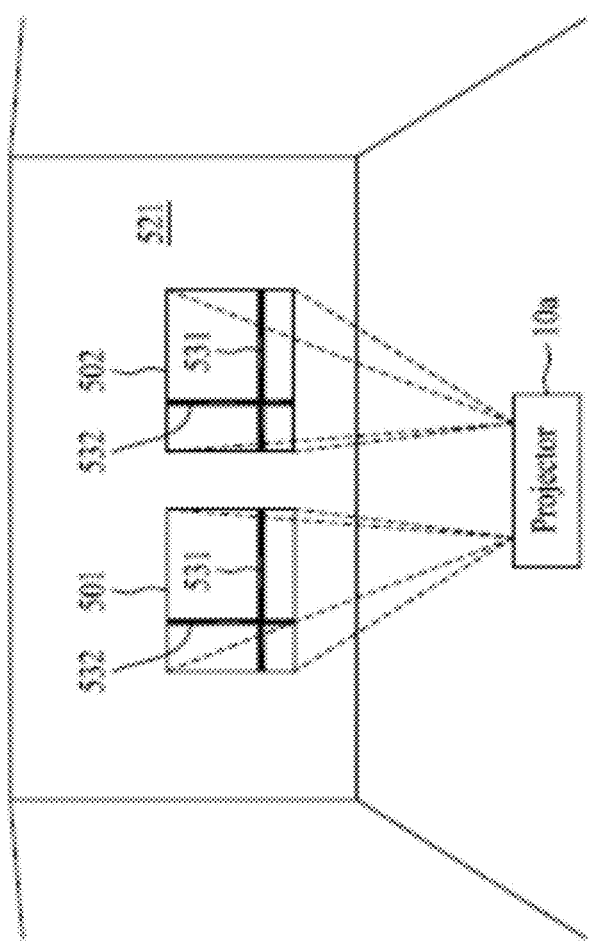
FIGS. 13-16 show various aspects of a display device casting projection images on a receiving surface in accordance with embodiments.

FIG. 13 illustrates that display device 10a may project projection images on a receiving surface 521. Display device 10a according to 10 comprises two projection outputs with moveable projection chambers and output optics which controllably position project images in a first projection area 501 and a second projection area 502 respectively. In embodiments, projection area 501 and projection area 502 are set adjacent to each other horizontally but not connected.

It is to be understood that that keystone correction may be applied in the condition of the projection path 31 of a projection chamber 14 being not perpendicular to receiving surface 521, so as to display images corresponding to orthogonal image coordinates.

The orthogonal image coordinates refer to a stored data format, positional arrangement for pixels, or an assumed output format for display of the video information. In some embodiments, pixel values are assigned or stored according to a positional arrangement of pixels in a planar image, such as a right angle x-y coordinate system. The x-y coordinate pixel locations are then used to determine where video data is output on an image. Characterizing video information according to orthogonal image coordinates denotes how they are stored and/or intended for display, and not necessarily how they are actually cast or displayed. Thus, for several present embodiments, the projection image may not always be truly orthogonal if keystone correction has not been applied. Namely, when the projection path 31 of a projection chamber 14 is not perpendicular to receiving surface 521, keystone distortion of the image may appear. Keystone distortion often produces a trapezoidal image for rectangular video information intended for display according to orthogonal image coordinates. In some embodiments, the display device includes keystone correction tool for reducing keystone distortion.

In embodiments, display device 10a also includes one or more image detectors, such as camera module, configured to detect image of external environment, such as receiving surface 521, and to detect projection images, such as video images projected in first projection area 501 and second projection area 502. In embodiments, two image detectors are disposed within each of the two projection chamber 14 of display devices 10a respectively, so as to utilize optical function of the projection lens system 112. In some other embodiments, image detector is disposed outside projection chamber 14; and each of projection chambers 14 comprises an image detector coupled to projection chamber housing externally. In other embodiments, display device 10a may comprise one or more image detector coupled to base 12, optionally with a positional interface to shift viewing angle of image device so as to detect image at various positions.

In other embodiments, image detector(s) may provide information of projection image to display device 10a for automatic keystone correction. Display device 10a may firstly project test images in the first projection area 501 and the second projection area 502. The test images may be quickly flashed in some cases so a user may or may not be aware of their presence. Each of the image detectors is capable of detecting the projection test image in real-time and providing the receiving information to control circuitry 76 so as to fix the keystone distortion in closed loops. In embodiments, the detected outlines of the projection images 501 and 502 are compared to predetermined orthogonal image coordinates so as to perform automatic keystone correction function. In other embodiments, the default test image may include a horizontal reference line 531 and a vertical reference line 532. The horizontal reference line 531 and the vertical reference line 532 may include graduation label therein. The automatic keystone correction may be performed by detecting distortion of the horizontal reference line 531 and the vertical reference line 532 of the projection image.

In embodiments, the display device 10a may include an image coordination tool to automatically coordinate multiple projection areas, such as first projection area 501 and second projection area 502.

As shown in FIG. 13, display device 10a may be used as video output of a computer device with a dual-screen GUI (graphic-based user interface). For instance, first projection area 501 is used for displaying host or original desktop; and second projection area 502 is used for displaying extension desktop.

A user may wish to have the first projection area 501 and second projection area 502 with the same size and the same altitude. In this application, the horizontal lines 531 detected by the image detector may be used by the image coordination tool for measuring the size and relative location of each projection area. By aligning the horizontal lines, the image coordination tool is capable of arranging the first projection area 501 and second projection area 502 at a same altitude.

In another embodiment, images 501 and 502 are connected horizontally. In this case, the image coordination may be used to remove any projection overlap between the images 502 and 504 on the receiving surface—after keystone correction. The removed portion of display may be taken from either projected image 502 or 504. A graphics processor associated with the images may then provide a continuous digital workspace between projection images 501 and 502, e.g., a mouse or pointer moves smoothly between the projection images 501 and 502 at their intersection.

Figure 14:
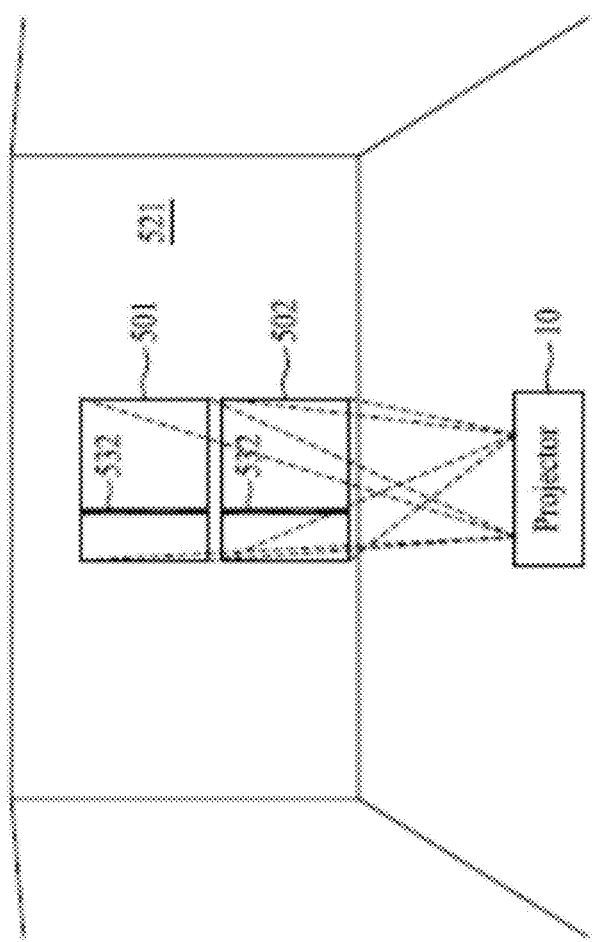

FIG. 14 illustrates that display device 10 may project two projection images on a receiving surface 521 in accordance with one of the present embodiments. Display device 10 according to FIG. 3 comprises three projection chambers 14. Two video signal sources are coupled to display device 10 so only two projection chambers 14 are used in this instance. Projection images are displayed in first projection area 501 and second projection area 502 respectively after keystone correction. In embodiments, projection area 501 and projection area 502 are set vertically adjacent to each other but not connected. Alternatively, the projection areas 501 and 502 may overlap or rest directly adjacent to each other in a vertical direction. The vertical reference lines 532 of each area captured by image detector are used by the image coordination tool to line up the first projection area 501 and the second projection area 502 by aligning the vertical reference lines 532.

Figure 15:
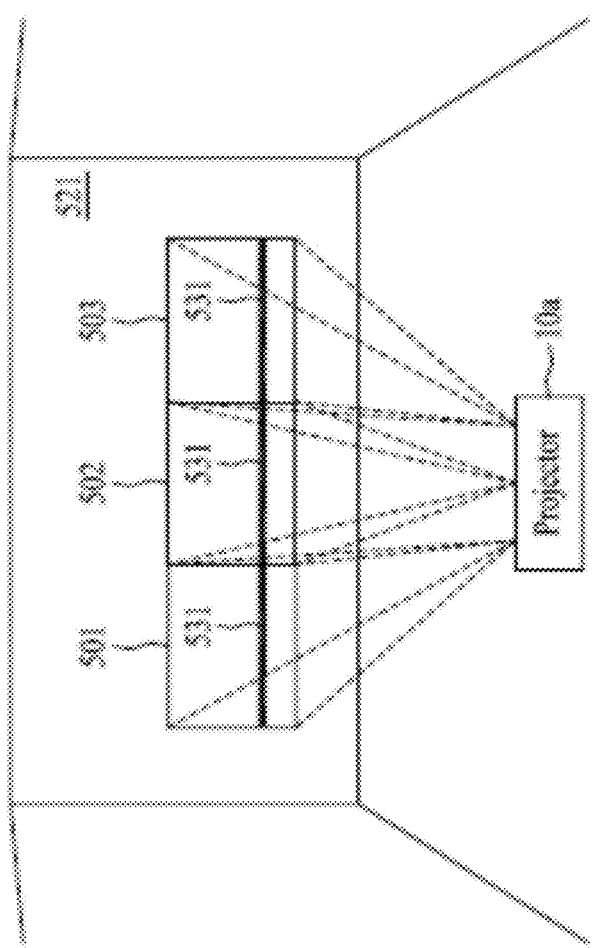

FIG. 15 shows that display device 10 may project a projection image on a receiving surface 521 in accordance with one of the present embodiments. Display device 10 according to FIG. 3 comprises three projection chambers 14. In embodiments, a single video signal source is coupled to display device 10; and three projection chambers 14 are used to output image jointly in first projection area 501, second projection area 502 and a third projection area 503. In another words, each of the first projection area 501, the second projection area 502 and the third projection area 503 is for displaying portion, such as one third, of a projection image. In embodiments, horizontal reference lines 531 with graduation labels may be employed by keystone correction tool and image coordination tool to adjust the projection output matching such predetermined settings and/or digital placement of each image relative to each other. In embodiments when the projection device 10 includes a positioning interface as described above, this digital positioning control of each image provides two mechanisms for positioning a projection image.

Figure 16:
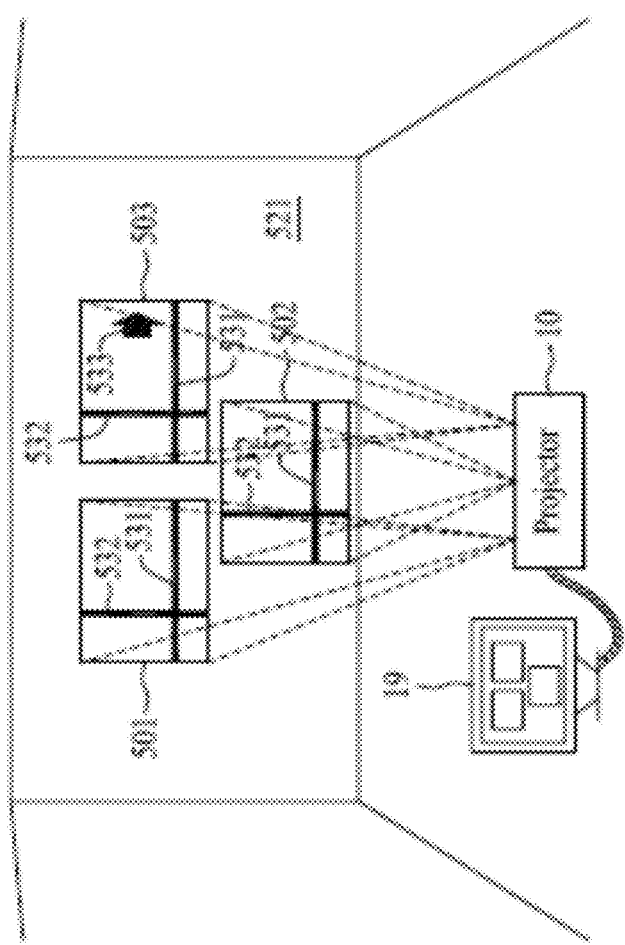

FIG. 16 illustrates that display device 10 may project three projection images on a receiving surface 521 in accordance with one of the present embodiments. Display device 10 according to FIG. 1, 3 or 4 comprises three projection outputs.

In embodiments, the display device 10 uses three projection chambers 14 to project images within three projection areas. First projection area 501 and third projection area 503 are lined up horizontally while second projection area 502 is placed below the first projection area 501 and third projection area 503 as shown. In embodiments, horizontal reference lines 531 and vertical reference lines 532 with graduation labels may be employed by keystone correction tool so as to form projection areas with the same size and with reduced keystone distortion. Intersections of horizontal reference lines 531 and vertical reference line 532 may be used by image coordination tool to adjust locations of the three projection areas to match such setting or default.

In embodiments which user may selectively move and locate first projection area 501, the second projection area 502 and third projection area 503 on the receiving surface 521 according to his/her preference. User may control the position of each projection areas by using OSD (On-screen display) interface 533 such as an arrow as shown. In other embodiments, display device 10 incorporates a built-in screen or is able to connect to an accessory external display 19 as shown. User may drag each of the projection areas to a preferred location through GUI (Graphics-based user interface) displaying on built in screen or accessory external display 19 by pointer, such as mouse input. In other embodiments user may drag each of the projection areas by finger touch on the built-in screen or accessory external display 19 which has touch-screen function.

Figure 17:
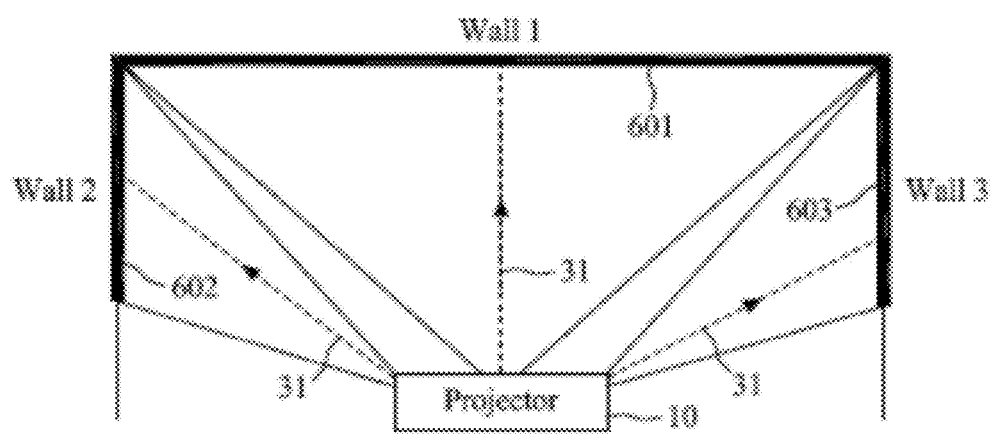
FIGS. 17-18 show various aspects of a display device projecting three projection images respectively on three receiving surfaces in accordance with embodiments.

FIG. 17 shows other embodiments which display device 10 projects three projection images on three receiving surfaces, first receiving surface 601, second receiving surface 602 and third receiving surface 603 on three walls respectively. Display device 10 according to FIG. 3 comprises three projection chambers 14. Each of the projection chambers projects image on one receiving surface.

As shown in FIG. 17, projection images on second receiving surface 602 and third receiving surface 603 may need keystone correction due to projection paths 31 from display device 10 being not perpendicular to second receiving surface 602 and third receiving surface 603. Projection image on first receiving surface 601 may also need keystone correction. Although in FIG. 17 the projection path from display device 10 is perpendicular to first receiving surface 601, it may not be perpendicular in another cross-section or horizontally centered to Wall 1 as shown, such as in the condition that display device 10 disposed on floor; and the image on surface 601 may need situation specific keystone correction.

In embodiments, the display device 10 is employed by a video game device for generating near-peripheral surrounding video. For example, a user sitting in front of display device 10 benefits from a full peripheral vision video game experience where objects may appear from not only the front but also the sides and be detected by peripheral vision. In embodiments, the display device 10 may be installed near to ceiling to prevent casting a shadow of user.

It should be noted that the above-described embodiments are more general than connecting multiple images and are applicable to a variety of techniques for casting the images on a surface efficiently where the assumption of the "fixed TV box" is not available. In other words, more generally, the presently described embodiments enable the projected content to be displayed according to a layout to optimize viewability.

In this regard, without knowing where a user is looking at with his or her eyes, for multiple images, embodiments have been described herein that ensure vertical lines are vertical and horizontal lines are horizontal. In yet another embodiment, with a camera configured to receive video input resulting from the projection of multiple images on the wall, in effect, the device can "see what it is doing" with respect to the projected content and make intelligent adjustments where something about the projected content is disturbing viewability.

A one image projector usually casts orthogonal to its receiving surface. The three image projection system having multiple outputs as described in various embodiments herein will generally have vertical and horizontal keystoning effects, however, since typically orthogonality will not necessarily be maintainable or sustainable. Accordingly, various embodiments can employ software that coordinates the projection of images dynamically based on feedback from the camera about how the images are displaying.

In some cases, a camera included in the projection system obtains image feedback for each of the three images. A controller on the projector or a device in communication with the projector receives the camera feedback and changes vertical and horizontal keystoning accordingly. The camera can also provide a measure of vertical and horizontal distortion for each image.

For example, a continuous horizontal line on all three images may be aligned, despite the offset image castings in height on the three surfaces—both in the horizontal and vertical directions. In this regard, video games often require knowledge of horizon lines for presentation of game graphics. The presently described embodiment thus facilitates the consistent presentation of video games despite different image casting conditions (e.g., as might be ubiquitous from a handheld device that moves with a user's hands).

Software alignment and coordination of the images is thus achievable. The result is the automatic maintenance of rectangular images on all three surfaces. Coordination marks may be cast to facilitate image vertical and horizontal alignment. These are lines or other fiduciary graphics that permit closed loop feedback with the camera. For example, red lines that should be connected on adjacent images may be flashed. The software may then manipulate the images to suitably align the fiduciary lines.

Figure 18:
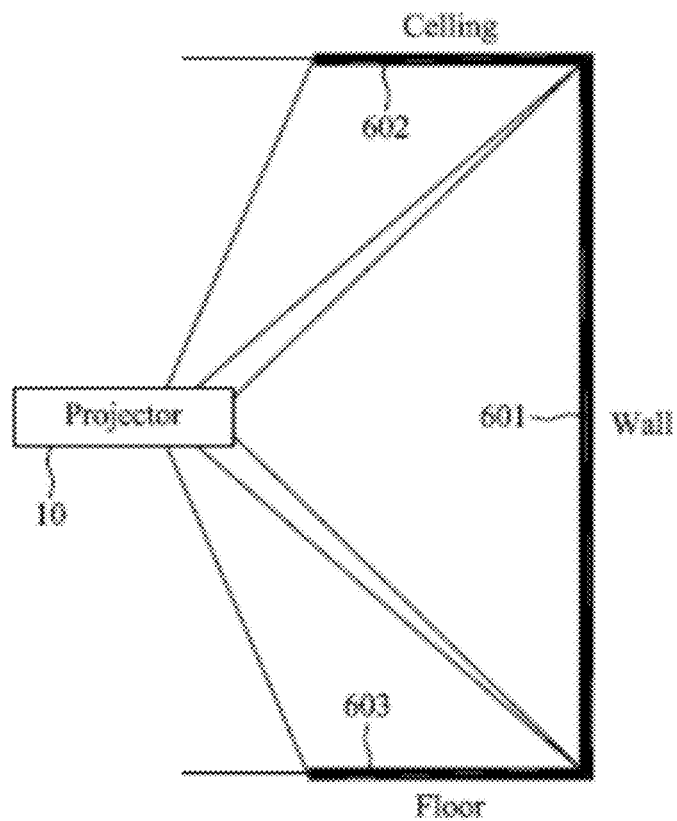

FIG. 18 shows other embodiments which display device 10 projects three projection images on first receiving surface 601, second receiving surface 602 and third receiving surface 603. First receiving surface 601 is on a wall in front of the display device 10. Second receiving surface 602 is on ceiling; and third receiving surface 603 is on floor.

In embodiments which the display device 10 employed by video game device for generating near-peripheral surrounding video, user may experience. For example, these kinds of embodiments may be applied in helicopter, plane and other flying games to form full visual feedback for a horizon change, e.g., the video ground rises or falls. Image coordination tool may be applied to adjust projection images to be projected at proper positions. Other embodiments of the three receiving surfaces may include projecting image on two walls and a ceiling, or on two walls and a floor. It is to be understood and appreciated that other multi-surface examples exist which are to be included within the scope of this disclosure and claims appended hereto.

Figure 19:
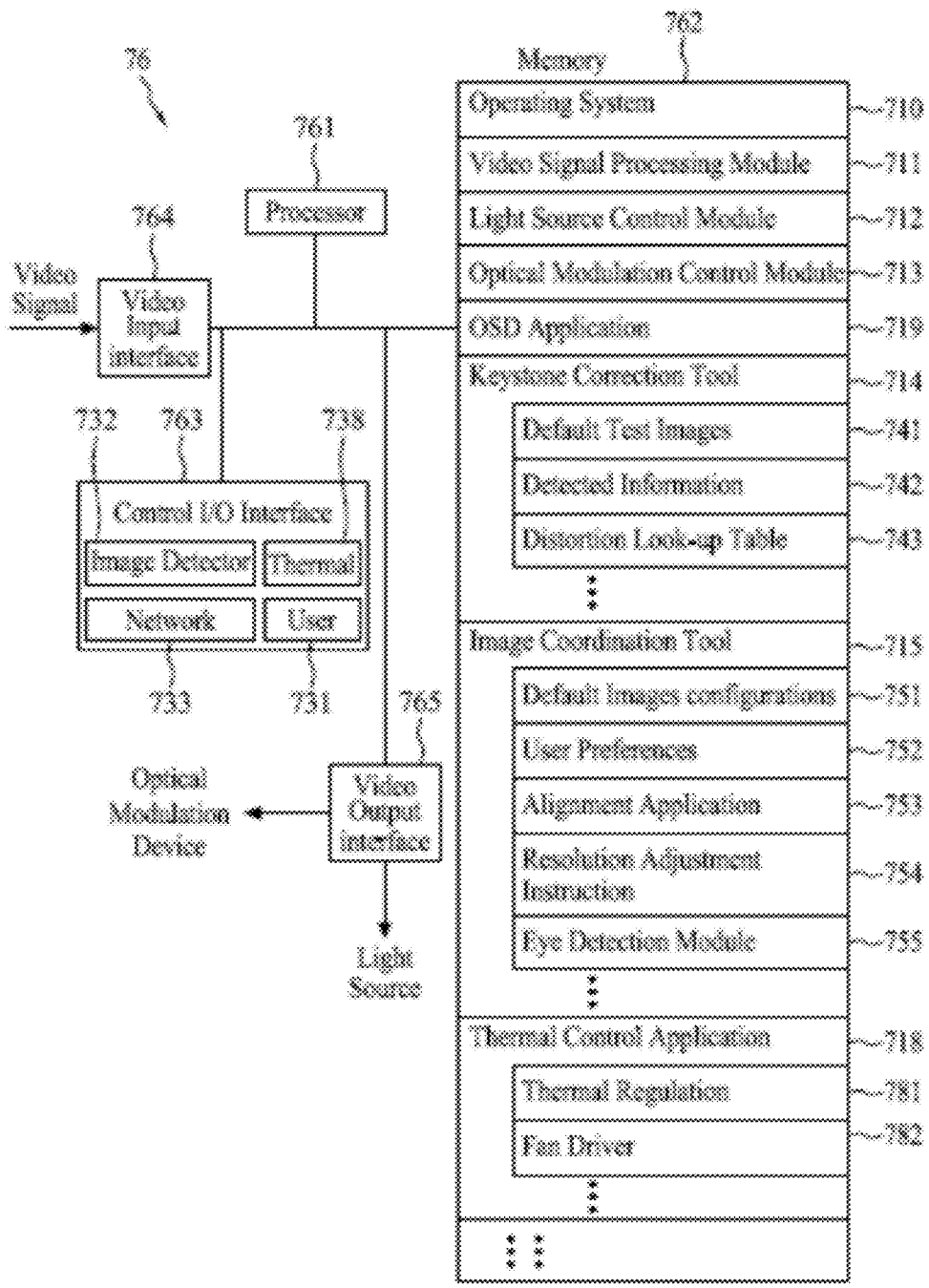
FIG. 19 illustrates an example block diagram of a control circuitry of display device in accordance with embodiments.

FIG. 19 shows an example block diagram illustrating a control circuitry 76 of display device 10 in accordance with several embodiments. As mentioned, input/output circuitry 74 and input ports 78 collectively permit communication between display device 10 and a device that outputs a video signal carrying video data. Video signal provided to control circuitry 76 may be in an analog or digital form. In some embodiments, input/output circuitry 74 and control circuitry 76 convert analog video signals into digital video signals suitable for digital operation of optical modulation device 102. In some other embodiments, input/output circuitry 74 may also include support software and logic for particular connector types, such as processing logic required for video signal input from S-video cabling or digital video signal.

Control circuitry 76 receives video signal that has been pre-processed by input/output circuitry 76 and then further processes video signal so as to provide control signals to components of display device 10 for outputting video projection according to video signal.

In embodiments, control circuitry 76 may include a processor 761, a memory 762, a control input/output interface 763, a video input interface 764 and a video output interface 765. Video input interface 764 couples to input/output circuitry 74 for receiving pre-processed video signal from input/output circuitry 764. Video output interface 765 couples to light source 64 and optical modulation devices 102 for providing control signals, which are based on the video signal and further modulation by control circuitry 76.

Control input/output interface 763 may include user interface 731, image detector interface 732, network interface 733 for coupling to user input devices, image detector and a network connecting to display device 10. User input device may include embedded/built-in control button(s), keypad, display, touch screen or stick controller; or accessory external mouse, keyboard, display with or without touch-screen function, remote controller or other controller. OSD (On-screen display) control instructions may be displayed on embedded/built-in display or touch screen, external display, or on the projection image.

Processor 761 may be a commercially available processor, controller or microprocessor such as one of the Intel or Motorola family of chips for processing/calculating data based on programs, modules or data structures in memory 762. In other embodiments, processor 761 and at least part of memory 762 are manufactured as a single chip; namely, a system on chip application. Memory 762 may include high speed random access memory and may also include non-volatile memory, such as one or more magnetic disk storage devices. Memory 762 may optionally include one or more storage devices.

The memory 762 in control circuitry 76 may store the following programs, modules and data structures, or a subset or superset thereof: an operation system 710, a video signal processing module 711, a light source control module 712, an optical modulation control module 713, a key stone correction tool 714, an image coordination tool 715, a thermal control application 718, an OSD (On-screen display) application 719, etc.

Operating system 710 includes procedures for handling various basic system services and for performing hardware dependent tasks.

OSD (On-screen display) application 719 contains control icons or figures that may be displayed on embedded/built-in display or touch screen, external display, or on the projection image; it also contains rules and instructions in associated with user's input.

Video signal processing module 711 is used for processing the video signal from input/output circuitry 764 so as to construct frame based control signals which may be adopted by optical modulation device 102.

Light source control module 712 is for controlling red laser set 961, green laser set 962, blue laser set 963 and switch 8 within light source 64 in order to drive light source 64 to divert the red laser beam, the green laser beam and the blue laser beam in a predetermined sequential order to each of the three projection chambers 14. Optical modulation control module 713 is for driving optical modulation device 102.

Keystone correction tool 714 may include one or more distortion reducing algorithm. It may utilize several stored default test images 741 such as those include horizontal references line 531 and/or vertical reference lines shown in the figures described above, and also utilize detected information 742 such as projection image feedback detected by image detector to perform auto keystone correction. In embodiments, keystone correction tool 714 includes a distortion look-up table to fast define a predetermined correction parameter according a match-up result of detected projection image feedback and default test image.

Image coordination Tool 715 may include one or more algorithm to coordinate images to be projected by multiple projection chambers according to user's preference or default configurations. In embodiments, default image configurations 751 and/or user preferences 752 may be stored in the memory 762. Image coordination tool 715 may employ keystone correction tool 714 for coordinating multiple images in a close loop, so as to generate video output not only at target locations but also better matching desired shapes and sizes. In embodiments, an alignment application 753 included in image coordination tool 715 may be used for aligning multiple images such as shown in FIGS. 13, 14, 15 and 16; alignment application 753 may employ horizontal reference line 531 and/or vertical reference line 532 of keystone correction tool 714 to perform its function.

Thermal control application 718 may include stored thermal regulation 781 and fan driver 782. Temperature information detected by thermal detector 80 is provided to control circuitry 76 through thermal interface 738. Thermal control application 718 drives 62a and/or 62b based on thermal regulation 782 and the received thermal information.

Figure 20:
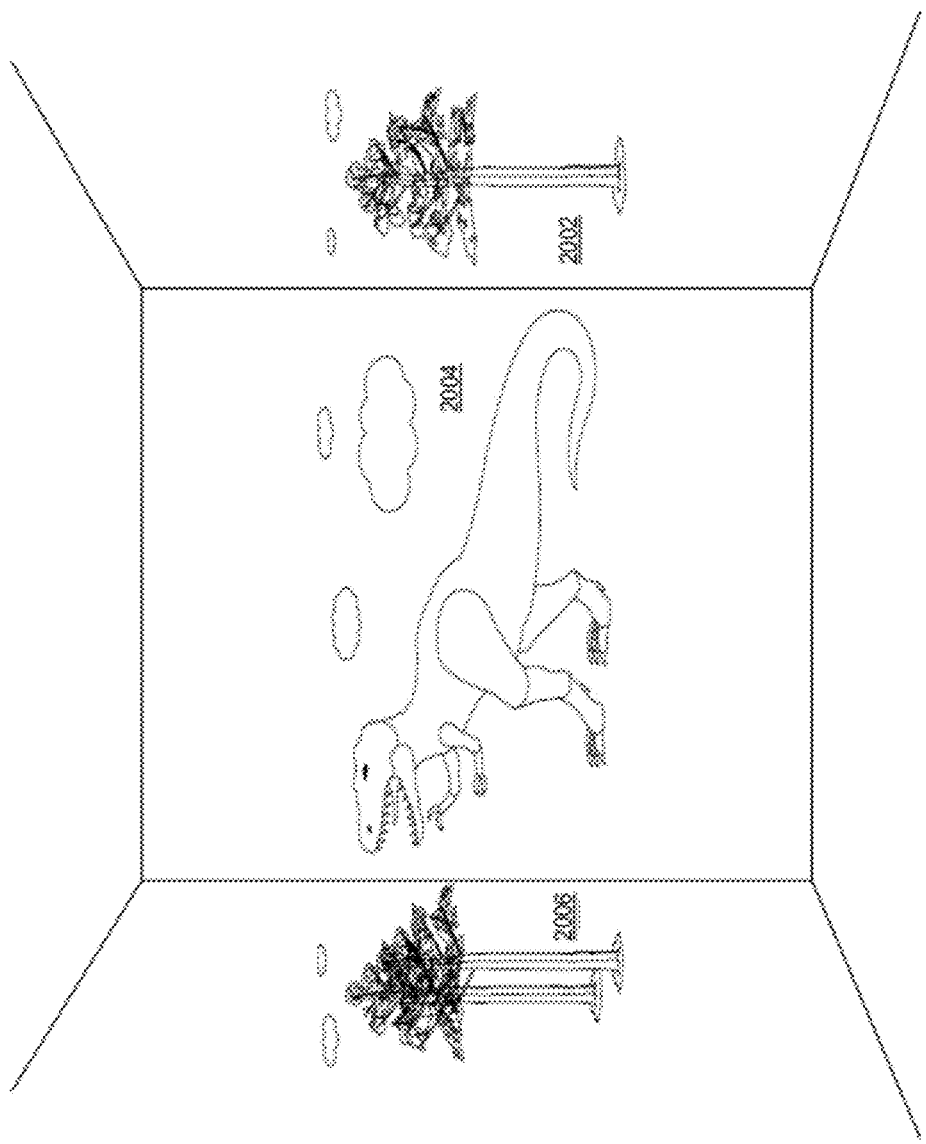
FIG. 20 illustrates an example visual output according to embodiments.

FIG. 20 shows an exemplary video output according to embodiments. In embodiments, for example, display device 10 allocates relatively higher processing resource for the central image 2004 and allocates relative lower processing resource for the subsidiary images such as the right image 2002 and the left image 2006; namely, the video resolution of central image 2004 is higher than the video resolution of right image 2002 and left image 2006. This may be performed by a resolution adjustment instruction 754 included in the image coordination tool 715 and may benefit data processing for operating system 710. In this example, the display device can be a portable electronic device, such as a mobile phone or other handheld media or content rendering device, and with the control of multiple light outputs implemented by the portable electronic device as described herein for one or more embodiments, significant coverage of the wall can be achieved, though perhaps not full coverage due to limitations on power of portable electronic devices, and the like.

Of particular note are the limitations that gaming content on handheld devices has suffered in the past without the projection of content as described herein. Namely, due to limited screen real estate, the gaming experience on handheld devices has suffered. In short, a limited amount of eye or pixel resolution makes some tasks in a game tedious if only a small screen is available. For instance, slight motion may be hardly noticeable on a small screen or a screen having limited resolution. However, with the multiple projection output switching techniques described herein, a much larger screen is realized on a wall or other surface, and the gaming experience is vastly improved from small form factor devices, e.g., gaming from small form factors is limitless when greater than equal to 60 inch images can be projected efficiently onto a surface. Additionally, while documents such as Excel spreadsheets are difficult to view on a small screen, when projected according to one or more of the embodiments herein, the Excel spreadsheet can be viewed at full or even greater size.

Besides the central-weighted embodiments as described, the display device 10 may allocate relative higher processing resource for a predetermined angular range of user's visual field. This may be achieved by knowledge of the video data being presented and/or utilizing an eye sensor which is coupled to control circuitry and is configured to detect a direction of line of vision of a user. In the former case, for example in a video game in which the game knows and controls video output to the user, the system may make assumptions about where the user is gazing to reduce video information and processing to other parts. In the latter case, eye detection module 755 included in the image coordination tool 715 uses the fovea information retrieved by the eye sensor to set up a weighted video area; and the resolution adjustment instruction 754 may be applied to areas that outside the weighted video area so as to perform resolution adjustment, such as reducing video resolution in such area.

In embodiments, video details are reduced outside about forty degrees in angular separation from user's fovea, i.e., the line of vision. In other embodiments, video details are reduced in stages. For example, color may be reduced after twenty degrees in angular separation from user's fovea; and resolution may be diminished after forty or sixty degrees, etc.

Figure 21:
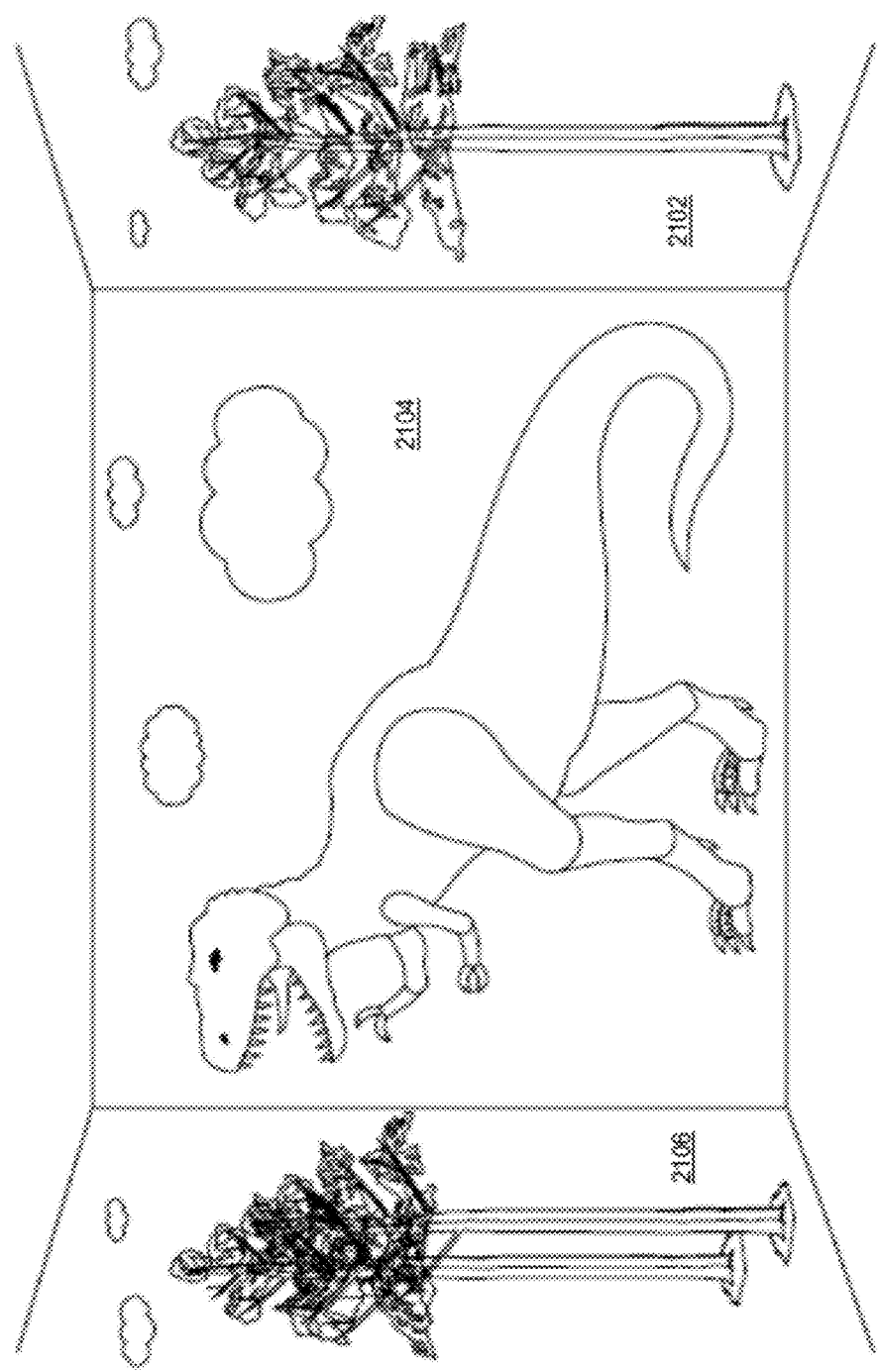
FIG. 21 illustrates another example visual output according to embodiments.

FIG. 21 shows another exemplary video output according to embodiments in which a multimedia console, personal computing device, set top box, disk player, media rendering device, etc., i.e., a system with greater projection capabilities than a typical handheld device, is employed to project an image across an entire wall floor to ceiling. As with FIG. 20, relatively higher processing resources can be allocated for the central image 2104 and relatively lower processing resources can be allocated for the subsidiary images, such as the right image 2102 and the left image 2106. In this example, in contrast to a portable handheld device which may have some limitations, the display device can be any computing device, such as a PC, set top box, multimedia or gaming console, or other full size media rendering device, which can display the projected images/video across the wall floor to ceiling in accordance with the techniques herein.

Figure 22:
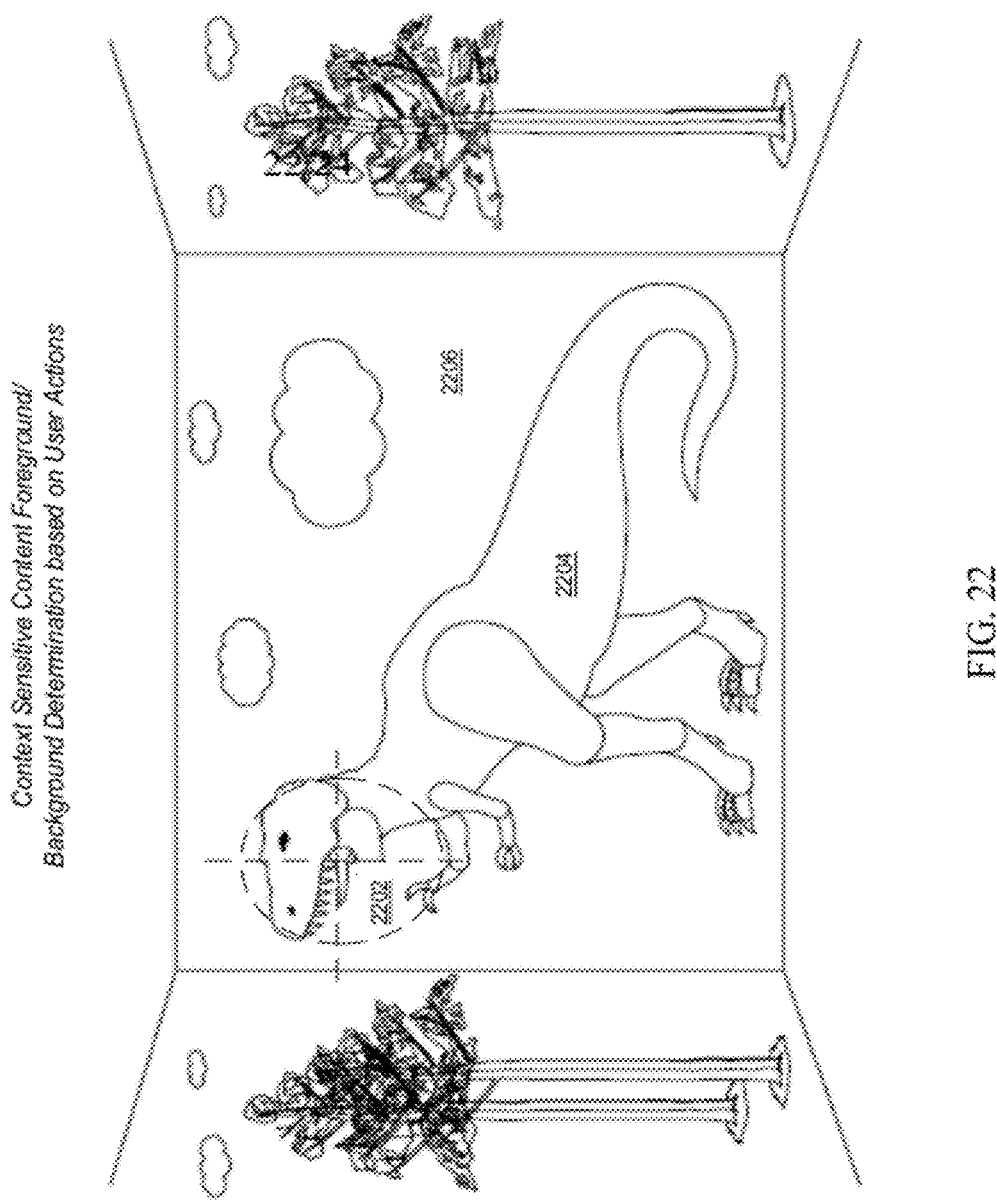
FIG. 22 illustrates exemplary, non-limiting embodiments in which content sensitive determination of foreground and background content of projected media, such as video game content, enhances a user experience.

FIG. 22 illustrates an exemplary, non-limiting embodiment employing content sensitive determination of foreground and background content of projected media, such as video game content, enhances a user experience, and is explained following some presentation of background regarding the human visual system. In this regard, with knowledge of which part of media content a viewer is staring or gazing at with his or her eyes, a publisher of the media content, or media rendering device, can apply enhancement algorithms to the media content, such as a video game, based on distinguishing between foreground imagery and background imagery. Accordingly, in various non-limiting embodiments, user context sensitive techniques for distinguishing between foreground and background for video output for multiple projected images are provided.

By way of some background, human vision employs a number of information reduction mechanisms to reduce the amount of visual information in an environment to a manageable level. Such mechanisms include shape detection and foreground/background separation. Foreground/background separation divides an environment to into a foreground where more information is processed (e.g. more detail) and a background where less information is processed (e.g. less detail). Shape detection allows a person to recognize objects based on reduced information, such as outer contours that resemble a shape for the object.

In one embodiment, the invention leverages the background information reduction mechanism to reduce the amount of video information displayed by a multiple image projector. The foreground of human vision is defined by the angular separation of rods and cones. Cones are concentrated in the center, or fovea centralis. Rods are absent there, but dense elsewhere.

Measured density curves for the rods and cones on the retina show an enormous density of cones in the fovea centralis, which are attributed for color vision capability and the highest visual acuity. Visual examination of small detail involves focusing light from that detail onto the fovea centralis. On the other hand, the rods are absent from the fovea. At a few degrees away from it their density rises to a high value and spreads over a large area of the retina. These rods are responsible for night vision, a highly sensitive type of motion detection, as well as our peripheral vision.

Notably, the cones are responsible for high resolution vision. The eye moves continually to keep the light from the object of interest falling on the fovea centralis where the bulk of the cones reside.

Correspondingly, with knowledge of foreground and background areas in media content, the amount of visual information in background portions of the video display can be reduced. This technique leverages the foreground/background visual processing mechanism in humans to reduce video storage and processing demands. Since an individual processes less information in a background visual region, reducing video output in an inactive portion may not sacrifice perceived video quality. In one non-limiting embodiment, video detail is reduced outside about 40 degrees in angular separation from the fovea. Other angular separation amounts or ranges can be suitable for use based on one or more variables affecting an environment.

In another specific embodiment, video detail is reduced in stages. For example, color may be reduced after 20 degrees in angular separation from the fovea, resolution may be diminished after 40 or 60 degrees, etc. In one embodiment, a portion of video of interest is used to determine where the person is looking, e.g., text that they should be reading at a known location. Video away from this foreground section is then deteriorated in acuity and detail.

There are at least two techniques for separating foreground and background. First, a camera can be used to detect where the person is looking to help determine where the person's visual foreground is, i.e., gaze tracking can be employed. The camera can be calibrated to find a user and the user's eyes at a time of context sensitivity, e.g., when the user is entering input into a field or other UI element on screen (for example, entering a user name). In this regard, at the time of entering the input, it is highly likely the user is staring at that field or other UI element. At such time, not only can the UI element be treated like the foreground, thereby reducing background requirements, but also the system is calibrated to find the user's eyes. Information in the background section may then be decreased in detail, particularly in color, while maintaining luminance detail and motion so as to not diminish from relatively larger perception of these in the periphery.

However, with respect to a second technique, gaze tracking may not be available or possible for certain environments for projecting video content as described herein, e.g., for some embodiments involving a handheld device. In such instances, the notion of real-time determination of background and foreground can be achieved based on context sensitive user actions. For instance, as shown in FIG. 22, a user may be playing a video game in which a first person shooter has gone back in time to hunt dinosaurs. In such a game, when the user aims target 2202 on the head of 3-D dinosaur object 2204, it is generally known that the user is looking at the head of the dinosaur. In such case, entire dinosaur 2204 (or just its head) can be treated as the foreground (the currently important visual data) and the rest of the imagery 2206 can be treated as background and thus de-emphasized. Thus, video games are one application that can benefit from near-peripheral surrounding video. Other examples can be given where it is known based on display or game content what users are most likely to be looking at based on context, e.g., anytime the content demands entering input associated with a specific location on-screen.

The de-emphasis of background results in the reduction of size of the video data displayed and also reduces the processing load to output large images, saving power as well. Large images cast by multiple image projectors, as described herein, is revolutionary in that it provides vastly greater visual information for a person than in the past, i.e., this represents a paradigm shift from LCD screens. Portable display manufacturers, video game companies, graphics companies, etc. can all take advantage of the techniques for discriminating between foreground and background content as described herein.

Figure 23:
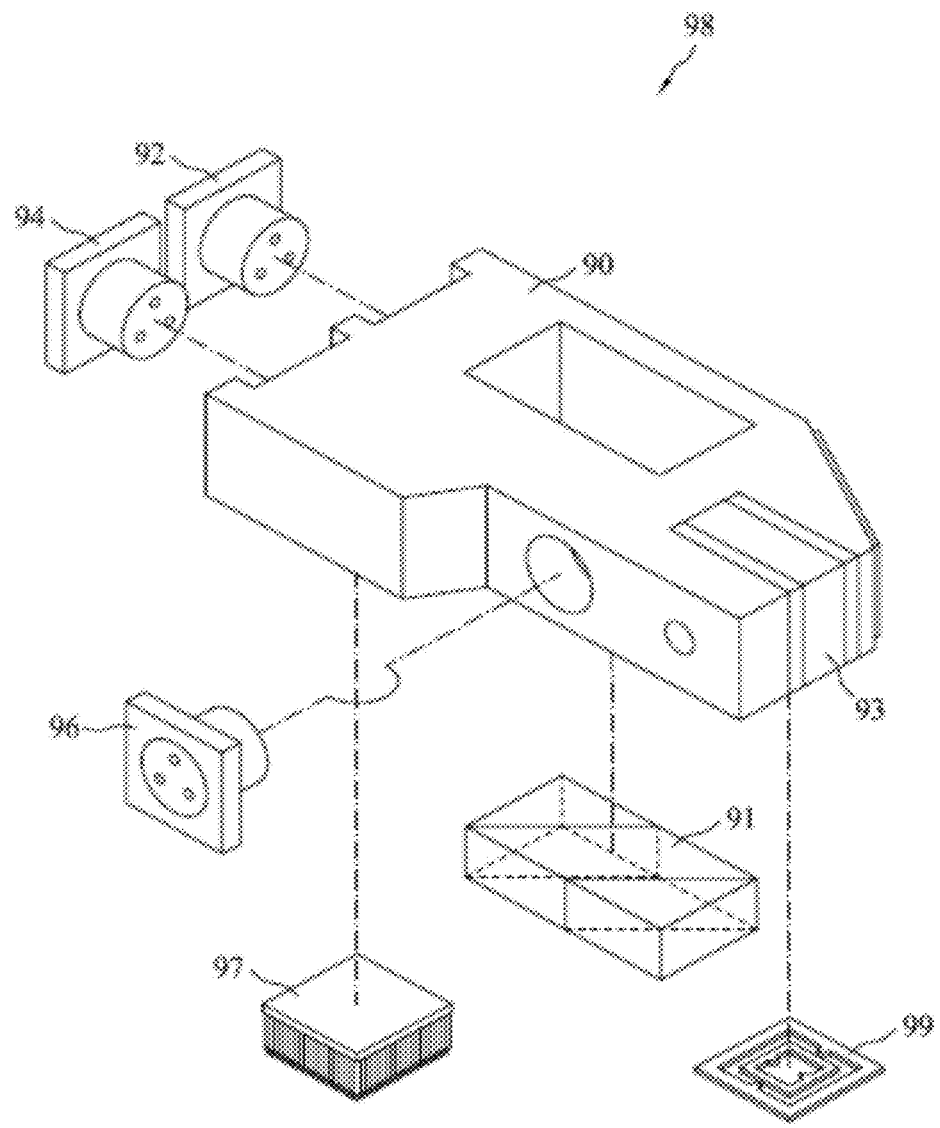
FIG. 23 illustrates another type of projector module that can be employed in one or more embodiments.

FIG. 23 illustrates another type of projector module that can be employed in some embodiments. Projector module 98 includes housing 90, red laser set 92, green laser set 94, blue laser set 96, optics 91, control circuitry 97, micro scanner 99, input/output circuitry (not shown), input/output interfaces (not shown), power supply (not shown) and projection lens system 93. Projector module 98 includes three light sources 92, 94 and 96, but with three separate outputs 95. In this regard, any of the embodiments described herein in the context of multiple chambers can be provided more generally as multiple projection outputs without constraining each light source to a chamber.

Housing 90 defines outer dimensions of projector module 98 and also provides mechanical protection for internal components of projector module 98. Housing 90 may also include air vents that permit airflow between chamber of housing 90 and external environment. Vents may also be placed on the housing 90. Power supply provides electrical power to red laser set 92, green laser set 94, blue laser set 96 and other components within projector module 98 that consume electrical power. Thus, power supply may provide electrical energy to control circuitry, input/output circuitry, fans, control circuitry 97 and micro scanner 99.

Several different embodiments of red laser set 92, green laser set 94 and blue laser set 96 may be provided. The optics 91 receives red, green and blue laser light from red laser set 92, green laser set 94 and blue laser set 96 respectively and provides three separate light outputs to micro scanner 99. The input/output circuitry provides video signal, from input/output interfaces, to control circuit 97. The control circuit 97 controls red laser set 92, green laser set 94 and blue laser set 96 respectively. During a time frame of pixel, red laser set 92, green laser set 94 and blue laser set 96 respectively generates predetermined power of laser corresponding to a predetermined gray scale of red, green or blue based on control signals from control circuitry 97.

Figure 24:
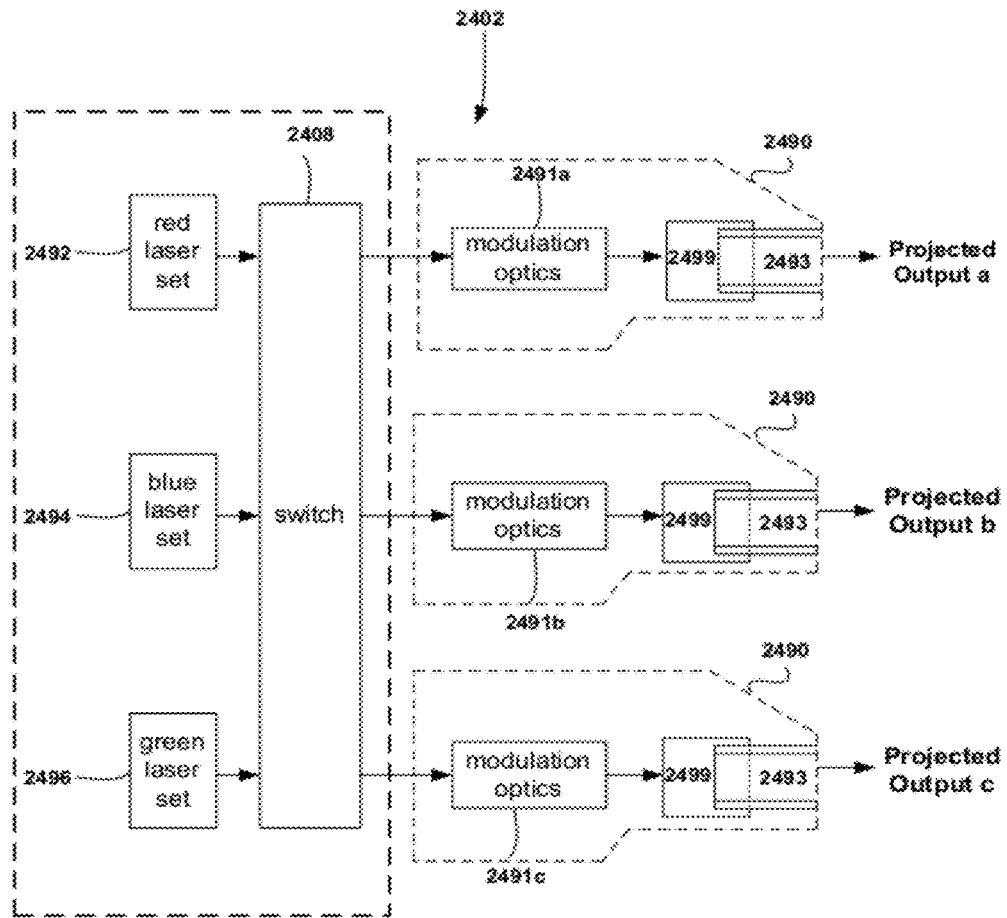
FIG. 24 illustrates yet another non-limiting embodiment in which the type of projector module depicted in FIG. 22 is employed to achieve switching among multiple outputs.

FIG. 24 illustrates another non-limiting embodiment based on the type of projector module set forth in FIG. 24. Similar to FIG. 4, projection apparatus 2402 includes separate laser (or LED) light sources 2492, 2494, 2496, which are input into switch 2408 which performs digital switching among light sources 2492, 2494, 2496. The outputs from switch 2408 from the controlled timing applied to light sources 2492, 2494, 2496 are input to projector modules 2490 respectively generating projected outputs a, b and c. Each projection module 2490 includes modulation optics 2491a, scanner 99 and projection lens systems 2493 for generating the respective outputs a, b and c.

Although the foregoing invention has been described in some detail for purposes of clarity of understanding, those skilled in the art will recognize that various modifications may be made within the scope of the appended claims. For example, although the positional interfaces described herein have coupled to the projection chamber from the bottom, it is understood that a positional interface may couple to the projection chamber from the rear. In this case, an air duct, electrical connection and optical cabling may extend through the projection chamber to its respective functional location. The invention is, therefore, not limited to the specific features and embodiments described herein and claimed in any of its forms or modifications within the scope of the appended claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

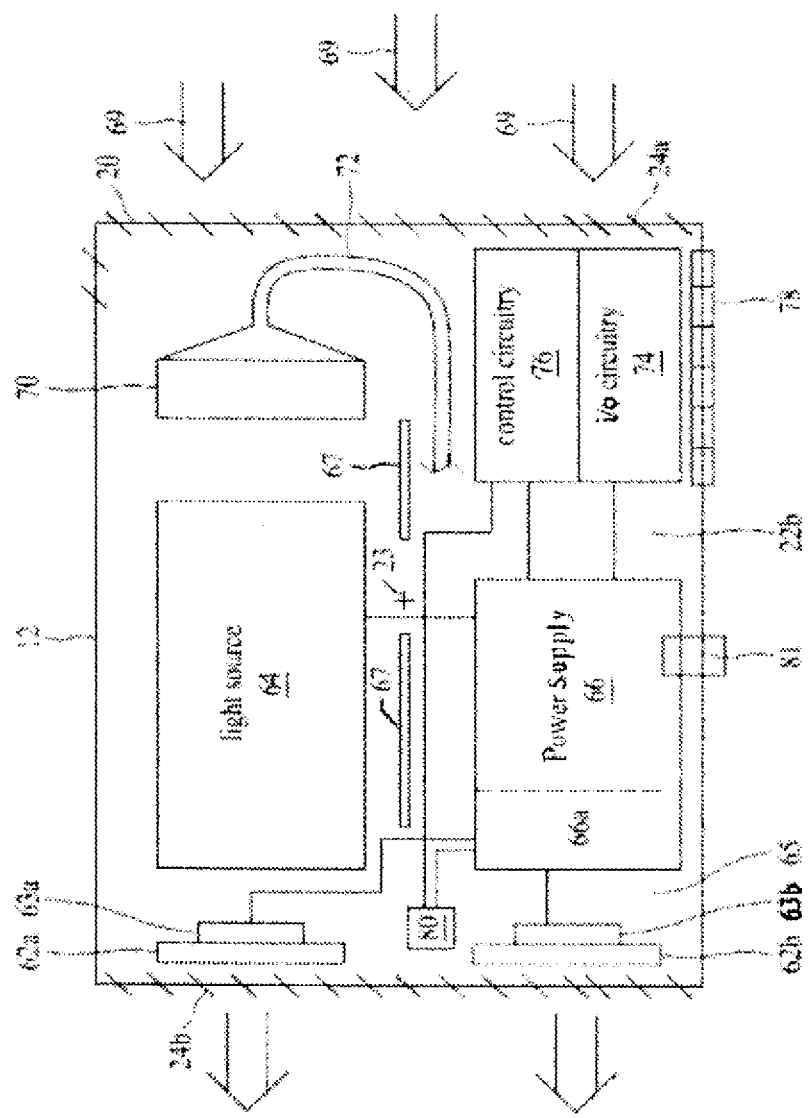

What is claimed is:

1. A system, comprising:
   an eye sensor configured to determine a position of a visual focal point relating to a presented image;
   an eye detection module configured to, based on the position of the visual focal point received from the eye sensor, determine a first image portion of a next image after the presented image and a second image portion of the next image, wherein the first image portion is represented at a first resolution and the second image portion is represented at a second resolution lower than the first resolution; and
   an image control component configured to receive the next image, and forward the first image portion of the next image to a first projection chamber configured to project the first image portion and adjust the first image portion to generate a first projected image with the first resolution,
   wherein the image control component is further configured to forward the second image portion of the next image to a second projection chamber configured to project the second image portion and adjust the second image portion to generate a second projected image with the second resolution.

2. The system of claim 1, wherein the second projected image is adjusted to reduce color content of the second image portion.

3. The system of claim 2, wherein the color content is reduced outside of about 20 degrees in angular separation of the second image portion from the visual focal point.

4. The system of claim 1, wherein a transition from the first image portion to the second image portion occurs after about 40 degrees of angular separation of the second image portion from the visual focal point.

5. The system of claim 1, wherein a transition from the first image portion to the second image portion occurs after about 60 degrees of angular separation of the second image portion from the visual focal point.

6. The system of claim 1, wherein the eye detection module is further configured to supplement information relating to the position of the visual focal point received from the eye sensor with context sensitivity information.

7. The system of claim 6, wherein the context sensitivity information relates to an interaction with a user interface.

8. The system of claim 7, wherein the eye detection module is further configured to designate image content of the user interface as the first projected image.

9. The system of claim 8, wherein the second image portion comprises at least one color, luminance information and motion information, and the image control component is further configured to decrease the at least one color and maintain the luminance information and the motion information.

10. The system of claim 6, wherein the context sensitivity information relates to a targeting device that identifies a point of interest in at least one of the first projected image or the second projected image.

11. The system of claim 1, further comprising:
a switching component configured to, in response to reception of a request to adjust at least one of the first projected image or the second projected image, selectively transmit light to the first projection chamber or the second projection chamber.

12. The system of claim 1, wherein the first projected image is combined with the second projected image to facilitate formation of the next image.

13. The system of claim 1, wherein the switching component is further configured to selectively source light output received from at least one light source to facilitate formation of the next image.

14. The system of claim 13, wherein the at least one light source comprises at least one of a red light source, a green light source or a blue light source and the at least one light source comprises at least one of a light emitting diode or a laser.

15. The system of claim 1, wherein first image portion of the next image comprises a region of the next image up to about 20 degrees in angular separation from the visual focal point.

16. The system of claim 1, wherein the first image portion of the next image comprises a region of the next image up to about 40 degrees in angular separation from the visual focal point.

17. The system of claim 1, wherein the first projection chamber comprises a first optical modulation device configured to adjust the first image portion to generate the first projected image and the second projection chamber comprises a second optical modulation device configured to adjust the second image portion to generate the second projected image.

18. A method, comprising:
based on a visual focal point of interest determined for a currently projected image, separating a next image, to be projected following the currently projected image, into a first projected portion and a second projected portion, wherein the next image has a first level of resolution and a location of the first projected portion is defined by the visual focal point;
directing the first projected portion to a first projection chamber, wherein the first level of resolution of the first projected portion of the next image is unaltered; and
directing the second projected portion to a second projection chamber, wherein the first level of resolution of the second projected portion of the next image is altered to a second level of resolution less than the first level of resolution.

19. The method of claim 18, further comprising reducing a color content in the second projected portion.

20. The method of claim 19, wherein the reducing the color content of the second projected portion occurs beyond about 20 degrees in angular separation of the second projected portion from the visual focal point of interest.

21. The method of claim 18, wherein the second level of resolution of the second projected portion occurs beyond about 40 degrees in angular separation of the second projected portion from the visual focal point of interest.

22. The method of claim 18, wherein the second level of resolution of the second projected portion occurs beyond about 60 degrees in angular separation of the second projected portion from the visual focal point of interest.

23. The method of claim 18, wherein the visual focal point of interest of the currently projected image is determined based on context sensitivity information.

24. The method of claim 23, wherein the context sensitivity information relates to a user interface comprising the next image to be projected.

25. The method of claim 24, further comprising designating image content of the user interface as the first projected portion.

26. The method of claim 18, further comprising adjusting a display of the second projected portion by decreasing at least one color of the second projected portion while maintaining at least one of an amount of luminance or motion information of the second projected portion.

27. The method of claim 18, further comprising switching output from at least one light source between the first projection chamber and the second projection chamber facilitating displaying of at least one of the first projected portion or the second projected portion.

28. The method of claim 27, wherein the at least one light source comprises at least one of a red light source, a green light source or a blue light source and the at least one light source comprises at least one of a light emitting diode or a laser.

29. The method of claim 18, wherein the first projected portion of the next image comprises a region of the next image up to about 20 degrees in angular separation from the visual focal point of interest.

30. The method of claim 18, wherein first projected portion of the next image comprises a region of the next image up to about 40 degrees in angular separation from the visual focal point of interest.

31. A computer-readable storage medium, comprising computer executable instructions that, in response to execution, cause a computing system to perform operations, comprising:

based on a visual focal point of interest determined for a currently projected image, separating a next image, to be projected following the currently projected image, into a first projected portion and a second projected portion, wherein the next image has a first level of resolution and a location of the first projected portion is defined by the visual focal point;

directing the first projected portion to a first projection chamber, wherein the first level of resolution of the first projected portion is unaltered; and directing the second projected portion to a second projection chamber, wherein the first level of resolution of the second projected portion is altered to a second level of resolution less than the first level of resolution.

32. The computer-readable storage medium of claim 31, wherein the operations further comprise reducing a color content of the second projected portion.

33. The computer-readable storage medium of claim 31, wherein the operations further comprise determining the visual focal point of interest based on context sensitivity information.

34. The computer-readable storage medium of claim 31, wherein the operations further comprise determining the visual focal point of interest based on context sensitivity information relating to at least one of a user interface comprising the next image or a targeting device identifying a point of interest in the next image.

35. The computer-readable storage medium of claim 31, wherein the operations further comprise switching an output from at least one light source between the first projection chamber and the second projection chamber facilitating displaying of at least one of the first projected portion or the second projected portion.

36. The computer-readable storage medium of claim 35, wherein the at least one light source comprises at least one of a red light source, a green light source or a blue light source and the at least one light source comprises at least one of a light emitting diode or a laser.

37. A system, comprising:
means for separating, based on a focal point of interest determined for a currently projected image, a next image, to be projected after the currently projected image, into a first projected portion and a second projected portion, wherein the next image has a resolution and a location of the first projected portion is defined by the focal point of interest;

means for directing the first projected portion to a first projection chamber and maintaining the first projected portion with the resolution; and means for directing the second projected portion to a second projection chamber and adjusting the second projected portion to another resolution level less than the resolution.

38. The system of claim 37, further comprising means for reducing color content in the second projected portion of the next image.

39. The system of claim 38, further comprising means for switching an output from at least one light source between the first projection chamber and the second projection chamber for facilitating display at least one of the first projected portion or the second projected portion.

40. The system of claim 39, wherein the at least one light source comprises at least one of a red light source, a green light source or a blue light source and the at least one light source comprises at least one of a light emitting diode or a laser.

* * * * *

UNITED STATES PATENT AND TRADEMARK OFFICE
CERTIFICATE OF CORRECTION

| | |
|---|---|
| PATENT NO. | : 8,459,803 B2 |
| APPLICATION NO. | : 13/452638 |
| DATED | : June 11, 2013 |
| INVENTOR(S) | : Plut |

Page 1 of 3

It is certified that error appears in the above-identified patent and that said Letters Patent is hereby corrected as shown below:

In the Drawings

Fig. 5 should be replaced with the corrected Fig. 5 as shown on the attached page.

In the Specification

Column 10, Line 51, delete "minor-based" and insert -- mirror-based --, therefor.

Column 12, Line 32, delete "device 20" and insert -- device 10 --, therefor.

Column 12, Line 33, delete "chamber 29" and insert -- chamber 14 --, therefor.

Column 12, Line 51, delete "micro-minor" and insert -- micro-mirror --, therefor.

Column 13, Line 55, delete "minor" and insert -- mirror --, therefor.

Column 13, Line 57, delete "minor" and insert -- mirror --, therefor.

Column 13, Line 66, delete "minors" and insert -- mirrors --, therefor.

Column 13, Line 67, delete "minor" and insert -- mirror --, therefor.

Column 14, Line 4, delete "minors" and insert -- mirrors --, therefor.

Column 14, Line 11, delete "minor" and insert -- mirror --, therefor.

Column 14, Line 30, delete "interface 102," and insert -- interface 70, --, therefor.

Signed and Sealed this
First Day of July, 2014

Michelle K. Lee
*Deputy Director of the United States Patent and Trademark Office*

CERTIFICATE OF CORRECTION (continued)
U.S. Pat. No. 8,459,803 B2

Column 14, Line 33, delete "minors" and insert -- mirrors --, therefor.

Column 16, Line 3, delete "minors" and insert -- mirrors --, therefor.

Column 16, Line 46, delete "generated" and insert -- generated. --, therefor.

Column 21, Line 16, delete "circuitry 76" and insert -- circuitry 74 --, therefor.

Column 22, Lines 42-43, delete "regulation 782" and insert -- regulation 781 --, therefor.

In the Claims

Column 30, Line 23, in Claim 39, delete "claim 38," and insert -- claim 37, --, therefor.